US011786952B2

(12) United States Patent
Scholey et al.

(10) Patent No.: US 11,786,952 B2
(45) Date of Patent: *Oct. 17, 2023

(54) SUPPORT ARM—TOOL CRADLE MODULE

(71) Applicant: Stolle Machinery Company, LLC, Centennial, CO (US)

(72) Inventors: Ian Kenneth Scholey, Lone Tree, CO (US); Karl S. Fleischer, Denver, CO (US); Alan W. Cleveland, Firestone, CO (US)

(73) Assignee: Stolle Machinery Company, LLC, Centennial, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/814,278

(22) Filed: Jul. 22, 2022

(65) Prior Publication Data

US 2022/0355359 A1  Nov. 10, 2022

Related U.S. Application Data

(60) Division of application No. 16/819,549, filed on Mar. 16, 2020, now Pat. No. 11,426,780, which is a continuation of application No. 15/496,046, filed on Apr. 25, 2017, now Pat. No. 10,625,324.

(51) Int. Cl.
*B21D 22/28* (2006.01)
*B21D 51/26* (2006.01)
*F16H 21/20* (2006.01)

(52) U.S. Cl.
CPC ........... *B21D 22/283* (2013.01); *B21D 22/28* (2013.01); *B21D 51/26* (2013.01); *F16H 21/20* (2013.01)

(58) Field of Classification Search
CPC .. B21D 51/26; B21D 51/2692; B21D 24/005; B21D 22/28; B21D 22/283; B21D 22/30
See application file for complete search history.

(56) References Cited

U.S. PATENT DOCUMENTS

| | | | | |
|---|---|---|---|---|
| 3,577,753 | A * | 5/1971 | Shah | B21D 22/28 72/349 |
| 3,735,629 | A * | 5/1973 | Paramonoff | B21D 24/00 72/449 |
| 6,351,980 | B1 * | 3/2002 | Jowitt | B21D 22/30 72/466.8 |
| 6,351,981 | B1 * | 3/2002 | Jowitt | B21D 22/30 72/466.8 |
| 6,357,982 | B1 * | 3/2002 | Jowitt | B21D 51/2692 413/69 |
| 2012/0304720 | A1 * | 12/2012 | Fleischer | B21D 43/003 72/20.1 |
| 2014/0083156 | A1 * | 3/2014 | Butcher | B21D 22/22 72/347 |
| 2015/0059428 | A1 * | 3/2015 | Butcher | B21D 22/28 72/347 |
| 2019/0232351 | A1 * | 8/2019 | Rukat | B21D 22/283 |

* cited by examiner

*Primary Examiner* — Bobby Yeonjin Kim
(74) *Attorney, Agent, or Firm* — Eckert Seamans Cherin & Mellott, LLC

(57) ABSTRACT

A unitary forward mounting assembly for a bodymaker includes a unitary forward mounting body with a cradle portion, a first support arm portion and a second support arm portion. The cradle portion has a forward side, a rear side, a right side, and a left side. The first support arm portion is disposed at the cradle portion right side. The second support arm portion is disposed at the cradle portion left side.

9 Claims, 22 Drawing Sheets

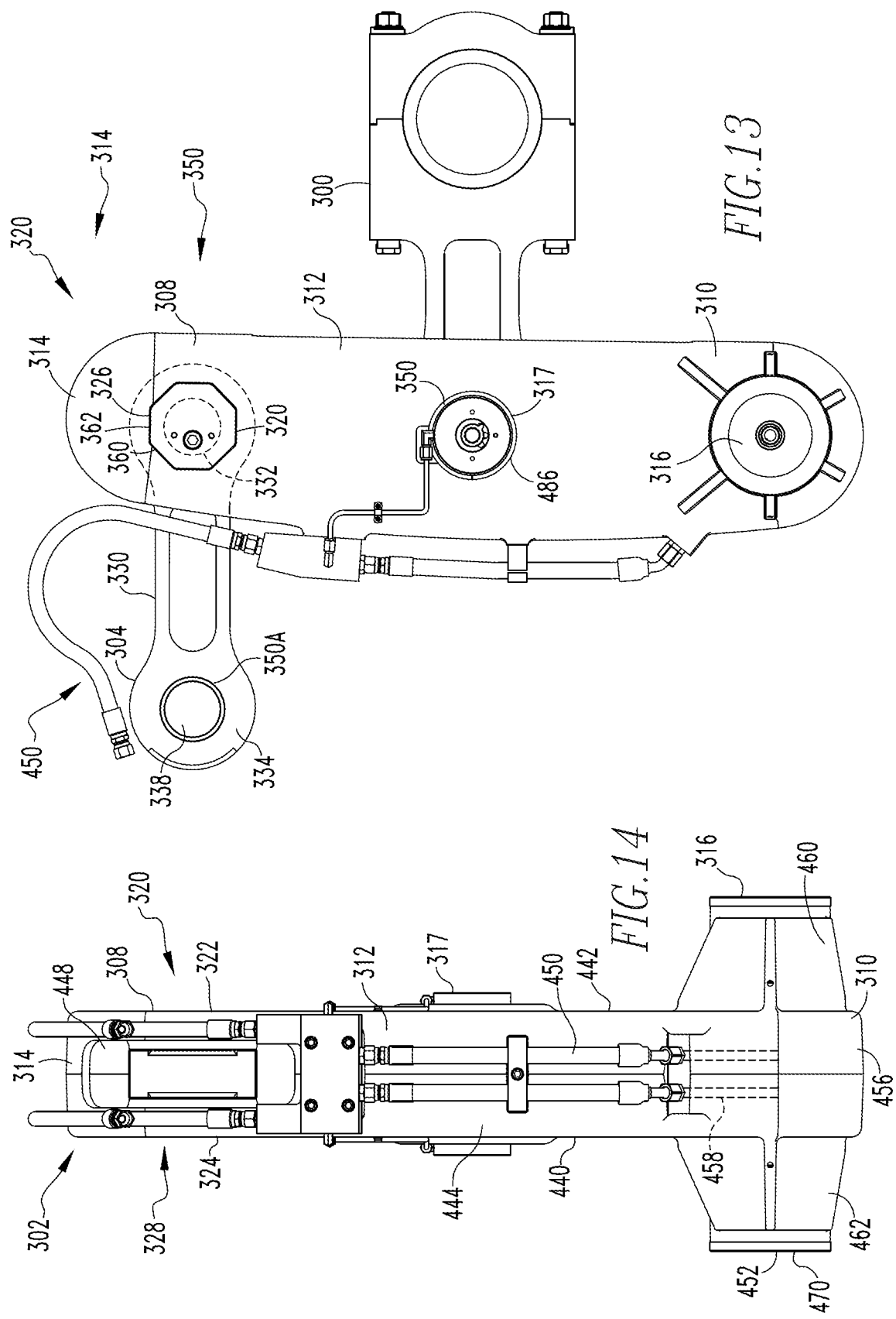

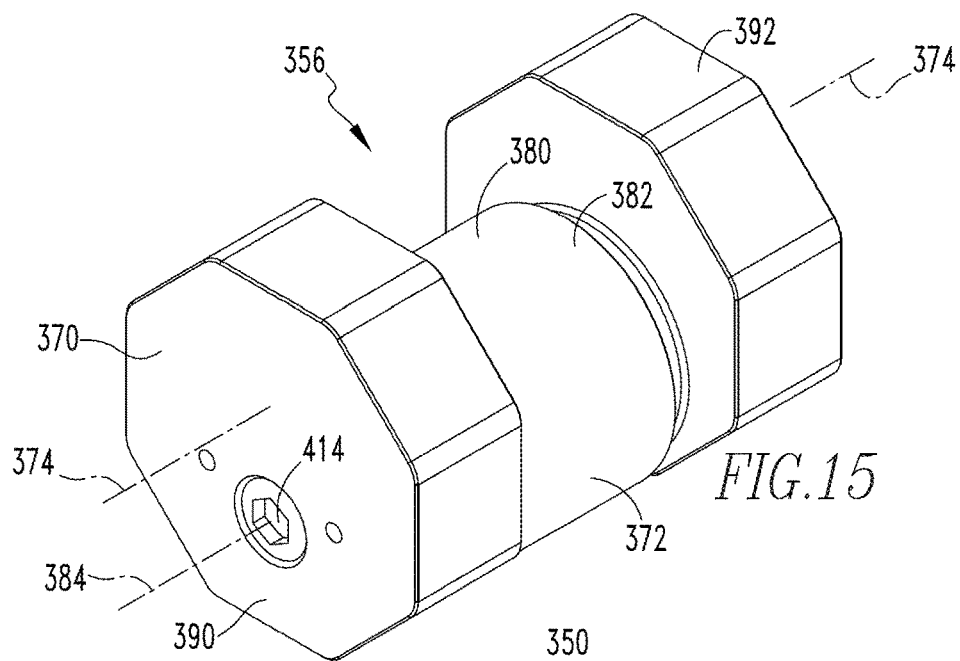
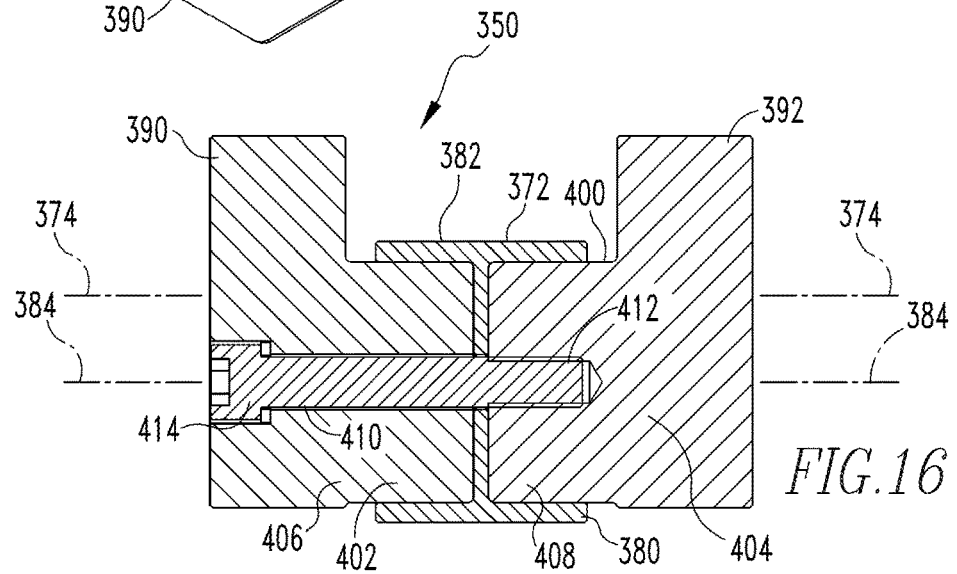
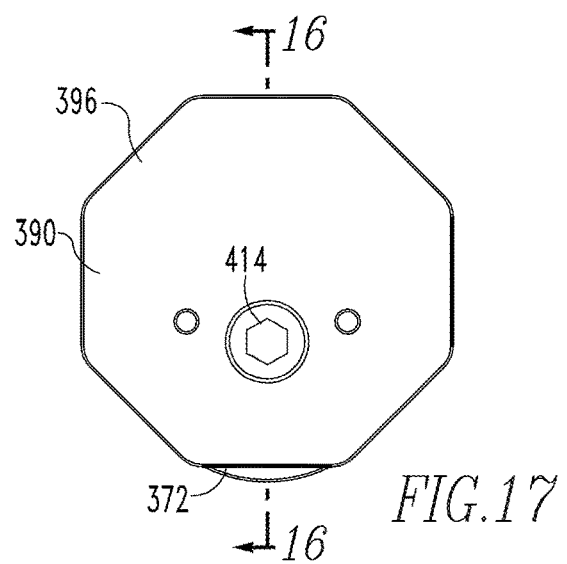

SUPPORT ARM—TOOL CRADLE MODULE

CROSS REFERENCE TO RELATED APPLICATIONS

This application is a divisional application of and claims priority to U.S. patent application Ser. No. 16/819,549, filed Mar. 16, 2020 entitled, SUPPORT ARM—TOOL CRADLE MODULE, which is a continuation application of and claims priority to U.S. patent application Ser. No. 15/496,046, filed Apr. 25, 2017, now U.S. Pat. No. 10,625,324, entitled, SUPPORT ARM—TOOL CRADLE MODULE.

FIELD OF THE INVENTION

The disclosed and claimed concept relates to a unitary forward mounting assembly of a bodymaker and, more particularly, to a unitary forward mounting body.

BACKGROUND OF THE INVENTION

Generally, a can, such as but not limited to an aluminum can or steel can, begins as a sheet of metal from which a circular blank is cut. Hereinafter, the can will be described as being made from aluminum, but it is understood that the selection of material is not limiting upon the claims. The blank is formed into a "cup." As used herein, a "cup" includes a bottom and a depending sidewall. Further, while cups and the resulting can bodies may have any cross-sectional shape, the most common cross-sectional shape is generally circular. Accordingly, while it is understood that the cups and the resulting can bodies may have any cross-sectional shape, the following description shall describe the cups, can bodies, punches, etc. as being generally circular.

The cup is fed into a bodymaker including a reciprocating ram and a number of dies. The elongated ram includes a punch at the distal end. A cup is disposed on the punch and passed through the dies which thin and elongate the cup. That is, the ram moved between a rearward, first position and a forward, second position. On each forward stroke of the ram, a cup is initially positioned in front of the ram. The cup is disposed over the forward end of the ram, and more specifically on the punch located at the front end of the ram. The cup is then passed through the dies which further form the cup into a can body. The first die is the redraw die. That is, a cup has a diameter that is greater than the resulting can. A redraw die reshapes the cup so that the cup has a diameter generally the same as the resulting can body. The redraw die does not effectively thin the thickness of the cup sidewall. After passing through the redraw die, the ram moves through a tool pack having a number of ironing dies. As the cup passes through the ironing dies, the cup is elongated and the sidewall is thinned. More specifically, the die pack has multiple, spaced dies, each die having a substantially circular opening. Each die opening is slightly smaller than the next adjacent upstream die.

Thus, when the punch draws the cup through the first die, the redraw die, the aluminum cup is deformed over the substantially cylindrical punch. As the cup moves through the redraw die, the diameter of the cup, i.e., the diameter of the bottom of the cup, is reduced. Because the openings in the subsequent dies in the die pack each have a smaller inner diameter, i.e., a smaller opening, the aluminum cup, and more specifically the sidewall of the cup, is thinned as the ram moves the aluminum through the rest of the die pack. The thinning of the cup also elongates the cup.

Further, the distal end of the punch is concave. At the maximum extension of the ram is a "domer." The domer has a generally convex dome and a shaped perimeter. As the ram reaches its maximum extension, the bottom of the cup engages the domer. The bottom of the cup is deformed into a dome and the bottom perimeter of the cup is shaped as desired; typically angled inwardly so as to increase the strength of the can body and to allow for the resulting cans to be stacked. After the cup passes through the final ironing die and contacts the domer, it is a can body.

On the return stroke, the can body is removed from the punch. That is, as the ram moves backwardly through the tool pack, the can body contacts a stationary stripper which prevents the can body from being pulled backward into the tool pack and in effect removes the can body from the punch. In addition to the stripper, a short blast of air may be introduced through the inside of the punch to aid in can body removal. After the ram moves back to an initial position, a new cup is positioned in front of the ram and the cycle repeats. Following additional finishing operations, e.g., trimming, washing, printing, etc., the can body is sent to a filler which fills the can body with product. A top is then coupled to, and sealed against, the can body, thereby completing the can.

One type of bodymaker includes a generally horizontal ram. That is, the ram body extends, and moves, generally horizontally. In this configuration, a first end of the ram body is coupled to a drive assembly and the punch is disposed at the second end. The forming operations described above generally occur near, or at, the ram body second end. To accomplish the forming operations, the die pack, domer assembly, cup feed assembly, stripper assembly, can body take-away assembly as well as other elements are coupled to the bodymaker by a forward mounting assembly.

It is understood that due to the speed of the bodymaker and the narrow tolerances between the dies and the ram, the ram body must be precisely aligned with the die pack. Similarly, other elements coupled to the forward mounting assembly must be precisely positioned relative to the other elements of the bodymaker. If not, the ram/punch will contact the die pack, or other elements thereby damaging all the elements involved in the impact.

Generally, the forward mounting assembly includes a cradle element into which the die pack is disposed. Two support arms are coupled to the forward end of the cradle element. The support arms support the domer assembly. To ensure that the cradle element is properly positioned relative to the ram, the coupling surfaces, i.e., where the elements are mated, on the cradle element and the support arms are machined to have specific dimensions. The installation of the cradle element on the bodymaker includes an alignment process. That is, the cradle element is installed and selected measurements are taken. If the cradle element is not properly aligned, shims or similar constructs are installed at the coupling surface. The measurements are retaken to determine if a proper alignment has been achieved. If not, the alignment process is repeated. Typically, this alignment process is repeated many times before the cradle element is properly aligned. Once the cradle is installed, the support arms are also coupled to the cradle element. That is, the machined coupling surfaces of the support arms are coupled to the machined coupling surfaces of the cradle element. The installation of the support arms also requires an alignment process. Typically, this alignment process is also repeated many times.

Thus, there are several problems with the present forward mounting assembly. First, the various elements such as, but not limited to, the cradle element and support arms must be mated and aligned. Second, the installation process is time consuming and a mistake in the alignment process can cause serious damage to the bodymaker. Further, assembling the forward mounting assembly at the bodymaker occupies space in an industrial area where other workers and/or other equipment is in operation. This is not an optimal procedure as the workers and equipment required to assemble the forward mounting assembly interfere with other operations. There is, therefore, a need for a forward mounting assembly that is not subject to these problems.

SUMMARY OF THE INVENTION

The disclosed and claimed concept solves these problems and provides a unitary forward mounting assembly for a bodymaker including a unitary forward mounting body with a cradle portion, a first support arm portion and a second support arm portion. The cradle portion has a forward side, a rear side, a right side, and a left side. The first support arm portion is disposed at the cradle portion right side. The second support arm portion is disposed at the cradle portion left side. Because the cradle portion, the first support arm portion and the second support arm portion are part of a unitary body, the unitary forward mounting assembly solves the problems stated above. That is, because the support arms are not mated to the cradle, there is no need for machined coupling surfaces; nor is there a need for aligning the support arms on the cradle. Further, the disclosed concept provides for an aligned forward module wherein additional components coupled to the unitary forward mounting assembly are positioned and aligned prior to coupling the unitary forward mounting assembly to the bodymaker frame assembly. In this configuration, the unitary forward mounting assembly and associated components can be assembled at a location that is remote from the bodymaker. Thus, the configuration of the unitary forward mounting assembly solves the problems stated above.

BRIEF DESCRIPTION OF THE DRAWINGS

A full understanding of the invention can be gained from the following description of the preferred embodiments when read in conjunction with the accompanying drawings in which:

FIG. 13 is a side view of a swing lever assembly.
FIG. 14 is a front view of a swing lever assembly.
FIG. 15 is an isometric view of a connection rod coupling assembly.
FIG. 16 is a cross-sectional side view of a connection rod coupling assembly.
FIG. 17 is a side view of a connection rod coupling assembly.

DETAILED DESCRIPTION OF THE INVENTION

Figure 1:
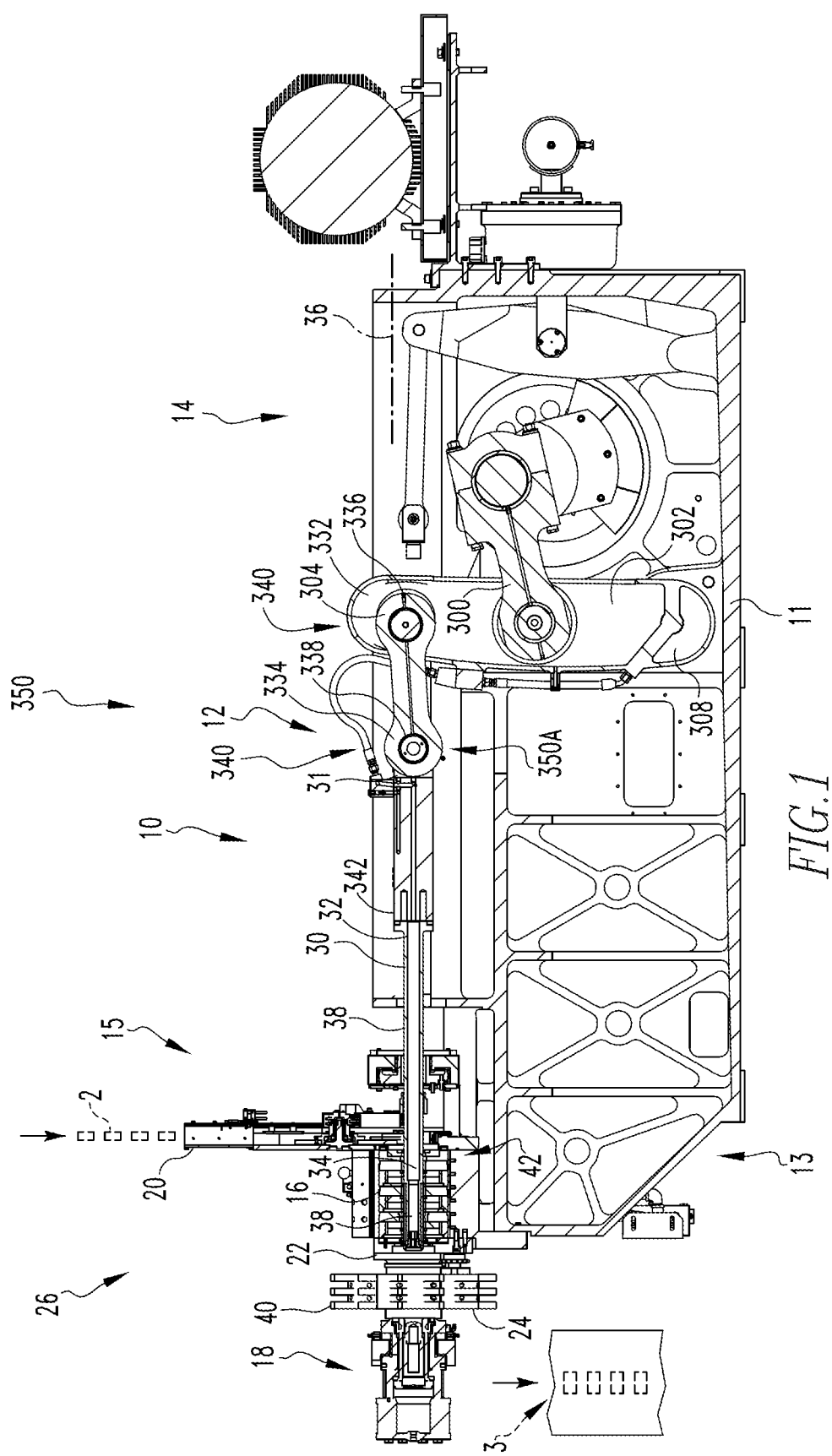
FIG. 1 is a schematic cross-sectional side view of a bodymaker.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As described below, a bodymaker 10 includes an elongated reciprocation ram assembly 12 and a domer assembly 18. As used herein, the domer assembly 18 is disposed at the "forward" end of the bodymaker 10. As used herein, when the ram assembly 12 is adjacent the domer assembly 18, the ram assembly 12 is at the "forward" end of its stroke. As used herein, the "rear" or "back" end of the bodymaker 10 is disposed opposite the "forward" end. Further, as used herein, the bodymaker 10 has a "longitudinal" direction that is parallel to the longitudinal axis of the ram assembly body 30, described below, as well as a "lateral" direction that is generally horizontal and perpendicular to the "longitudinal" direction.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, a "fastener" is a separate component structured to couple two or more elements. Thus, for example, a bolt is a "fastener" but a tongue-and-groove coupling is not a "fastener." That is, the tongue-and-groove elements are part of the elements being coupled and are not a separate component.

As used herein, the phrase "removably coupled" or "temporarily coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "temporarily disposed" means that a first element(s) or assembly (ies) is resting on a second element(s) or assembly(ies) in a manner that allows the first element/assembly to be moved without having to decouple or otherwise manipulate the first element. For example, a book simply resting on a table, i.e., the book is not glued or fastened to the table, is "temporarily disposed" on the table.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, a "planar body" or "planar member" is a generally thin element including opposed, wide, generally parallel surfaces, i.e., the planar surfaces of the planar member, as well as a thinner edge surface extending between the wide parallel surfaces. That is, as used herein, it is inherent that a "planar" element has two opposed planar surfaces. The perimeter, and therefore the edge surface, may include generally straight portions, e.g., as on a rectangular planar member, or be curved, as on a disk, or have any other shape.

As used herein, a "path of travel" or "path," when used in association with an element that moves, includes the space an element moves through when in motion. As such, any element that moves inherently has a "path of travel" or "path."

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately," i.e., in an approximate range relevant to the measurement as would be understood by one of ordinary skill in the art.

As used herein, a "radial side/surface" for a circular or cylindrical body is a side/surface that extends about, or encircles, the center thereof or a height line passing through the center thereof. As used herein, an "axial side/surface" for a circular or cylindrical body is a side that extends in a plane extending generally perpendicular to a height line passing through the center. That is, generally, for a cylindrical soup can, the "radial side/surface" is the generally circular sidewall and the "axial side(s)/surface(s)" are the top and bottom of the soup can.

As used herein, the terms "can" and "container" are used substantially interchangeably to refer to any known or suitable container, which is structured to contain a substance (e.g., without limitation, liquid; food; any other suitable substance), and expressly includes, but is not limited to, beverage cans, such as beer and soda cans, as well as food cans.

As used herein, "generally curvilinear" includes elements having multiple curved portions, combinations of curved portions and planar portions, and a plurality of planar portions or segments disposed at angles relative to each other thereby forming a curve.

As used herein, a "contour" means the line or surface that defines an object. That is, for example, when viewed in cross-section, the surface of a three-dimensional object is reduced to two dimensions; thus, a portion of a three-dimensional surface contour is represented by a two-dimensional line contour.

As used herein, a "perimeter portion" means the area at the outer edge of a defined area, surface, or contour.

As used herein, "generally" means "in a general manner" relevant to the term being modified as would be understood by one of ordinary skill in the art.

As used herein, "substantially" means "for the most part" relevant to the term being modified as would be understood by one of ordinary skill in the art.

As used herein, "at" means on and near relevant to the term being modified as would be understood by one of ordinary skill in the art.

As shown in FIG. 1, a can bodymaker 10 is structured to convert a cup 2 into a can body 3. As described below, the cup 2 is assumed to be substantially circular. It is understood, however, that the cup 2, as well as the resulting can body 3 and elements that interact with the cup 2 or can body 3, may have a shape other than substantially circular. A cup 2 has a bottom member with a depending sidewall defining a substantially enclosed space (none shown). The end of the cup 2 opposite the bottom is open. The can bodymaker 10, in an exemplary embodiment, includes a housing or frame assembly 11 (hereinafter "frame assembly" 11) a reciprocating, elongated ram assembly 12, a drive mechanism 14, a redraw assembly 15, a die pack 16, a domer assembly 18, a cup feeder 20 (shown schematically), a stripper assembly 22 (shown schematically), and a take-away assembly 24. As used herein, the die pack 16, a domer assembly 18, the cup feeder 20, the stripper assembly 22, and the take-away assembly 24 are collectively identified as the "coupled components" 26. That is, as used herein, "coupled components" 26 are those elements and assemblies identified above and which are coupled, directly coupled, fixed, movably coupled, or temporarily coupled to the forward assembly 48, described below. The frame assembly 11 has a forward end 13. The drive mechanism 14 is coupled to the frame assembly 11 and operatively coupled to the ram assembly 12. The drive mechanism 14 is structured to, and does, impart a reciprocating motion to the ram assembly 12 causing the ram assembly 12 to reciprocate in a direction generally parallel to, or along, the longitudinal axis of the ram assembly 12.

As is known, the ram assembly 12, in an exemplary embodiment, includes a number of elements, such as a guide assembly and cooling assembly (none shown), that are not relevant to the present disclosure. For the purpose of this disclosure, elements of the ram assembly 12 include an elongated ram assembly body 30, a carriage 31, and a punch 38. That is, the ram assembly 12 includes an elongated, substantially circular body 30 with a proximal end 32, a distal end 34, and a longitudinal axis 36. The punch 38 is coupled, directly coupled, or fixed to the ram assembly body distal end 34. The ram assembly body 30 is coupled to the drive mechanism 14, as detailed below.

As is known, in each cycle the cup feeder 20 positions a cup 2 in front of the die pack 16 with the open end facing the ram assembly 12. When the cup 2 is in position in front of the die pack 16, a redraw assembly 15 biases the cup 2 against a redraw die (not shown). The drive mechanism 14 provides a reciprocal motion to the ram assembly body 30 causing the ram assembly body 30 to move back and forth along its longitudinal axis 36. That is, the ram body 30 is structured to reciprocate between a retracted, first position and an extended, second position. In the retracted, first position, the ram assembly body 30 is spaced from the die pack 16. In the second, extended position, the ram assembly body 30 extends through the die pack 16. Thus, the reciprocating ram assembly 12 advances forward (to the left as shown) passing through the redraw assembly 15 and engages the cup 2. The cup 2 is moved through the redraw die 42 and a number of ironing dies (not numbered) within the die pack 16. The cup 2 is converted into a can body 3 within the die pack 16. As the ram assembly 12 moves toward the first position, i.e., as the ram assembly 12 moves toward the drive mechanism 14, the stripper assembly 22 removes the can body 3 from the punch 38. The stripper assembly 22 is structured to, and does, remove a can body 3 from the punch 38 on the return stroke. The actuator piston is disabled so that the stripper fingers close around the punch 38 for stripping the can body 3 from the punch 38. As shown in FIGS. 2-6, the take-away assembly 24, shown as a rotating turret 40, is structured to, and does, operatively engage the can body 3 once, i.e., essentially simultaneously, it is removed from the punch 38. The take-away assembly 24 removes the can body 3 from the path of the ram assembly 12. It is understood that, as used herein, a "cycle" means the cycle of the ram assembly 12 which begins with the ram assembly 12 in the retracted, first position.

A forward assembly 48 includes the coupled components 26 and a unitary forward mounting assembly 50. That is, a number of the coupled components 26 are coupled to the bodymaker frame assembly 11 by the unitary forward mounting assembly 50. In an exemplary embodiment, the unitary forward mounting assembly 50 includes a unitary forward mounting body 52. As used herein, a "unitary forward mounting body" is a unitary body, as defined above that includes a mounting or a direct coupling for at least the die pack 16 and the domer assembly 18. In an exemplary embodiment, the die pack mounting door assembly 82, stripper bulkhead assembly mounting 74, turret sub-assembly mounting 76, domer door assembly mounting 72, and cup load station assembly mounting 78 are part of the unitary body 52.

In an exemplary embodiment, the unitary forward mounting body 52 includes a cradle portion 54, a first support arm portion 56 and a second support arm portion 58. The cradle portion 54 includes a forward side 60, a rear side 62, a right side 64, and a left side 66. The first support arm portion 56 is disposed at the cradle portion right side 64. The second support arm portion 58 disposed at the cradle portion left side 66. As used herein, a "cradle portion" 54 is a portion of a unitary forward mounting body that is structured to support a die pack 16, discussed below. As used herein, a "first support arm portion" 56 is a portion of a unitary forward mounting body 52 that is structured to support, or partially support, a domer assembly 18. As used herein, a "second support arm portion" 58 is a portion of a unitary forward mounting body 52 that is structured to support, or partially support, a domer assembly 18. In an exemplary embodiment, the unitary forward mounting body 52 is one of either a cast body or a printed body. As used herein, a "cast unitary body" means a ductile, non-toxic, soft metal that is a conductor of heat and electricity. That is, as used herein, a "cast body" defines the characteristics of the body and does not describe a "product by process." In an exemplary embodiment, the unitary forward mounting body cradle portion rear side 62, cradle portion 54, and support arm portions 56, 58 are a cast unitary body 52. As used herein, a "printed body" means a body including a number of thin strata. That is, as used herein, a "printed body" defines the characteristics of the body and does not describe a "product by process." It is noted that because the unitary forward mounting body 52 is a unitary body, no machined coupling surfaces exist between the various portions. Further, there is no need to couple the various portions to each other, or, to perform an alignment procedure for the various portions. Stated alternately, no shims are disposed between the cradle portion 54 and either of the first support arm portion 56 or the second support arm portion 58. This solves the problems stated above.

The unitary forward mounting body 52 includes one of, and in an exemplary embodiment, all of, a die pack mounting 70, a domer door assembly mounting 72, a stripper bulkhead assembly mounting 74, a turret sub-assembly mounting 76 or a cup load station assembly mounting 78. Generally, each "mounting" 70, 72, 74, 76, 78 is structured to support the element or assembly used to modify the term "mounting."

Figure 8:
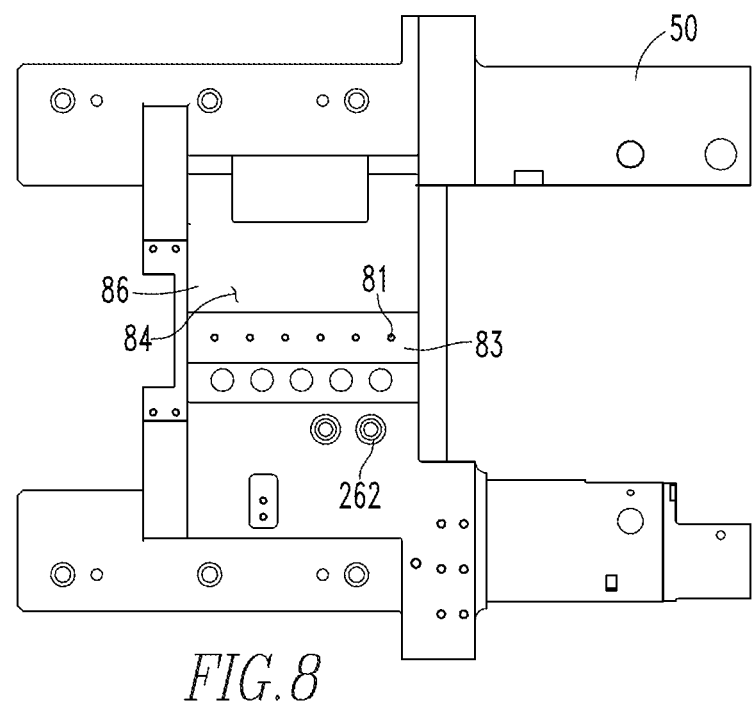
FIG. 8 is a top view of a unitary forward mounting assembly.
Figure 9:
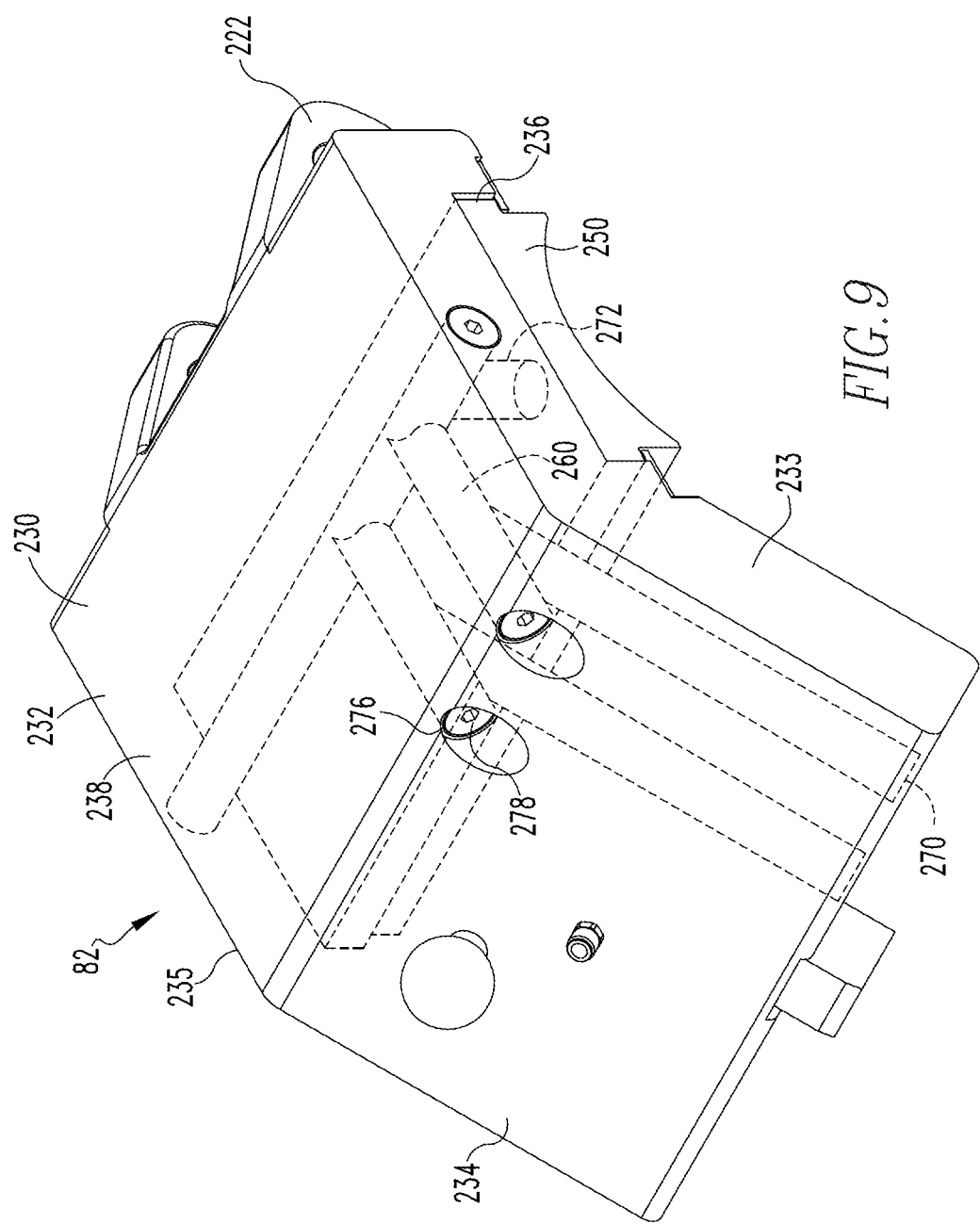
FIG. 9 is an isometric view of a die pack mounting door assembly.
Figure 10:
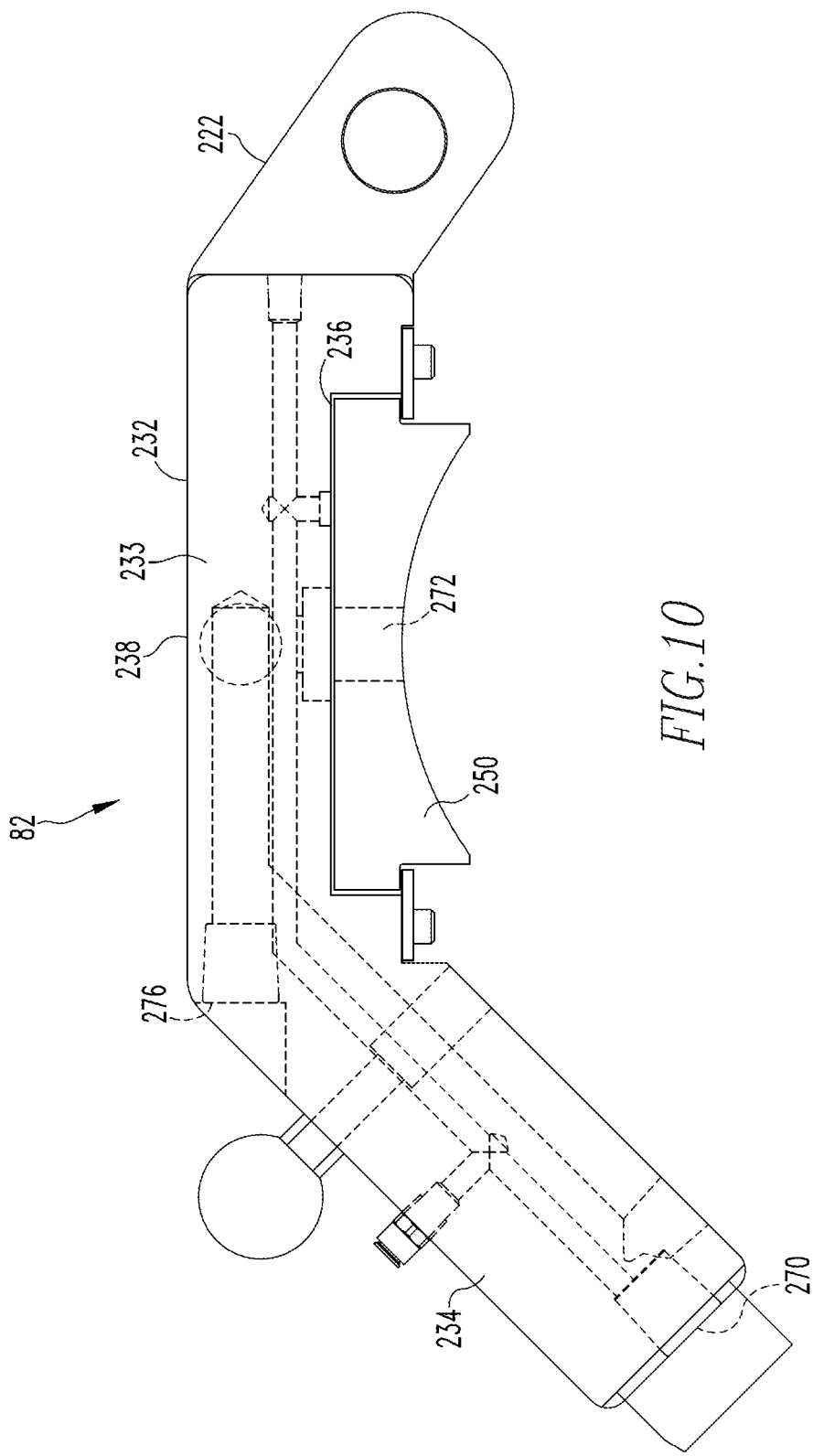
FIG. 10 is a front view of a die pack mounting door assembly.

In an exemplary embodiment, the cradle portion 54 defines the die pack mounting 70. In an exemplary embodiment, the die pack mounting 70 includes an elongated, generally concave bed 80 (FIGS. 7 and 8) and an elongated, movable door assembly 82 (FIGS. 9 and 10, described in more detail below). As used herein, a "die pack mounting bed" means a body having a contour, or a partial contour, structured to substantially correspond to the outer contour of a die pack 16. That is, the "die pack mounting bed" is shaped and contoured so that a die pack 16 can be disposed on the bed in a single orientation. In an exemplary embodiment, the die pack mounting bed 80 includes orienting constructs 81 such as spacer mountings 83. That is, the die pack mounting 70, in an exemplary embodiment, includes spacers (not shown) that are coupled, directly coupled, or fixed to the die pack mounting bed 80 and which are structured to orient the die pack 16 relative to the ram assembly 12.

The die pack mounting door assembly 82 is movably coupled to the die pack mounting bed 80 and moves between an open, first position, and a closed, second position. When the die pack mounting door assembly 82 is in the first position, the die pack mounting 70 is substantially open and provides access to the die pack mounting bed 80. When the die pack mounting door assembly 82 is in the second position, the die pack mounting door assembly 82 is disposed over the die pack mounting bed 80. Further, when the die pack mounting door assembly 82 is in the second position, the die pack mounting 70 defines a generally cylindrical cavity 84 having an inner surface 86 that generally corresponds to the outer surface of the die pack 16. As described below, the die pack 16 is disposed in and coupled, directly coupled, or temporarily coupled to, the die pack mounting cavity 84. Stated alternately, the die pack 16 is disposed in and coupled, directly coupled, or temporarily coupled to, the cradle portion 54.

Further, in an exemplary embodiment, the cradle portion 54 defines a number of internal cooling fluid passages 88. As described below, the cradle portion fluid passages 88 are in fluid communication with die pack mounting bed coolant passages 262, described below. In this configuration, there is no need to have, thus there are no, hose inlet couplings in the cradle portion 54.

Before discussing the domer door assembly mounting 72, it is noted that, in an exemplary embodiment, the domer assembly 18 includes a generally planar mounting plate hereinafter identified as "domer assembly door" 110 as well as a generally tubular housing assembly 112 (hereinafter "domer assembly housing" 112). The domer assembly housing 112 is open at one end (which faces the ram assembly 12) and closed at the other end (not numbered). As is known, the inner surface of the domer assembly housing 112 defines a convex dome (not shown). As shown, the domer assembly housing 112 extends through the domer assembly door 110 with the axis of the domer assembly housing 112 generally perpendicular to the plane defined by the domer assembly door 110. The domer assembly housing 112 is coupled, directly coupled, or fixed to the domer assembly door 110 in this position. In an exemplary embodiment, the domer assembly door 110 includes a lateral, first coupling tab 114 and a lateral, second coupling tab 116. The domer assembly door tabs 114, 116 are disposed on the lateral sides of the domer assembly door 110 and include a coupling component such as, but not limited to, a passage (not shown) for a fastener or other coupling component 118 (hereinafter "domer assembly door coupling" 118).

Figure 7:
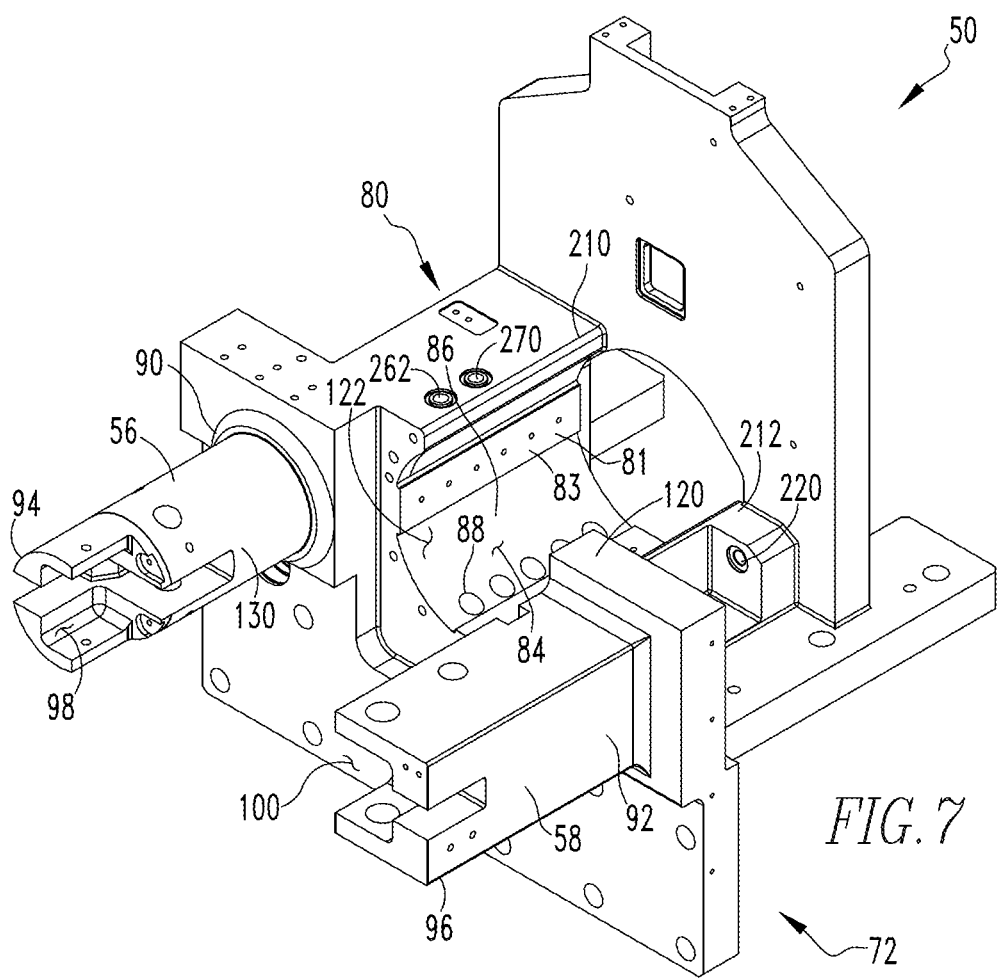
FIG. 7 is an isometric view of a unitary forward mounting assembly.

With a domer assembly 18 and domer assembly door 110 in this configuration, the first support arm portion 56 and the second support arm portion 58 define the domer door assembly mounting 72. As shown in FIGS. 7 and 8, the first support arm portion 56 and the second support arm portion 58 extend from the cradle portion forward side 60 a distance of between about 6.0 inches and 18.0 inches or about 12.0 inches. Thus, the first support arm portion 56 and the second support arm portion 58 each have a proximal end 90, 92 (respectively) and a distal end 94, 96. Each support arm portion distal end 94, 96 defines a cavity 98, 100 sized and shaped to correspond to an associated domer assembly door tab 114, 116 (hereinafter "support arm domer assembly door cavity" 98, 100). That is, each support arm domer assembly door cavity 98, 100 is structured to receive an associated domer assembly door tab 114, 116. Further, each support arm portion distal end 94, 96 defines coupling components (not shown) such as, but not limited to, a threaded bore (not shown) that corresponds to the domer assembly door coupling 118. Thus, as described below, the first support arm portion 56 and the second support arm portion 58 are structured to support the domer assembly door 110 (FIGS. 2 and 4) and, as such, are, in this exemplary embodiment, the domer door assembly mounting 72. Thus, the domer assembly 18 is coupled, directly coupled, or temporarily coupled to, both the first support arm portion 56 and the second support arm portion 58.

In an exemplary embodiment, the stripper assembly 22 includes a generally planar bulkhead member 120. The stripper assembly bulkhead member 120 includes a number of coupling components such as, but not limited to, passages through which a fastener or other coupling component (neither shown) extends. For this embodiment, the unitary forward mounting body 52 defines the stripper bulkhead assembly mounting 74. That is, the stripper bulkhead assembly mounting 74 is, in an exemplary embodiment, a cavity 122 disposed at the cradle portion forward side 60 and extending between the first support arm portion 56 and the second support arm portion 58. The stripper assembly 22, or parts thereof, are structured to, and do, fit within the stripper bulkhead assembly mounting cavity 122. The surfaces of the cradle portion forward side 60, the first support arm portion 56 and the second support arm portion 58 that define the stripper bulkhead assembly mounting cavity 122 include coupling components, such as, but not limited to threaded bores (not numbered). In this configuration, the stripper bulkhead assembly mounting 74 is unitary with the unitary forward mounting body 52. As such, there is no need to couple the stripper bulkhead assembly mounting 74 to other components. This solves the problems stated above.

As described above, in one embodiment the take-away assembly 24 includes a rotating turret 40. The turret 40 must be disposed adjacent to the path of travel of the ram assembly 12. Accordingly, in an exemplary embodiment, the first support arm portion 56 defines the turret sub-assembly mounting 76. That is, the first support arm portion 56 includes a substantially cylindrical surface 130, or a surface upon which a bearing (not shown) with a substantially cylindrical surface is disposed. The rotating turret 40 includes a substantially cylindrical inner surface (not numbered). The rotating turret 40 is rotatably coupled to the first support arm portion 56. In this configuration, the turret sub-assembly mounting 76 is unitary with the unitary forward mounting body 52 and, as such, solves the problems stated above. That is, there is no need to couple and align the turret sub-assembly mounting 76 with the unitary forward mounting body 52 thereby solving the problems stated above.

In an exemplary embodiment, the unitary forward mounting body 52 also includes a cup infeed housing plate 126. That is, the cup infeed housing plate 126 is unitary with the cradle portion 54. As before, the unitary nature of the unitary forward mounting body 52, including the cup infeed housing plate 126, solves the problems stated above. That is, as a part of the unitary forward mounting body 52 there is no need to assemble and align the cup infeed housing plate 126 thereby solving the problems stated above. The cup infeed housing plate 126, in the embodiment shown, includes a generally planar member 128 disposed at the cradle portion rear side 62 and adjacent the redraw assembly 15. The plane of the cup infeed housing plate planar member 128 is generally normal, i.e., perpendicular, to the longitudinal axis of the ram assembly 12. The cup infeed housing plate 126 is structured to, and does, support the cup feeder 20. Thus, the unitary forward mounting body 52, and in this embodiment the cup infeed housing plate 126, defines the cup load station assembly mounting 78.

In an exemplary embodiment, the unitary forward mounting body 52 and a number of the coupled components 26 are assembled as an "aligned forward module" 150. As used herein, an "aligned forward module" means an assembly wherein a number of the coupled components 26 are coupled to, and aligned relative to a selected point on the unitary forward mounting body 52. Further, the "aligned forward module" 150 is a specific construct and is not a construct made by a selected process. Further, as used herein, "aligned relative to a selected point on the unitary forward mounting body" means that the number of the coupled components 26 do not require further alignment relative to other elements of the bodymaker 10, including the ram assembly 12, after the unitary forward mounting body 52 is coupled to the frame assembly 11. Additionally, as used herein, a "complete aligned forward module" 152 is similar to an "aligned forward module" 150 but the coupled components 26 include the die pack 16, a domer assembly 18, the cup feeder 20, the stripper assembly 22, and the take-away assembly 24.

Thus, in an exemplary embodiment, the bodymaker 10 includes the frame assembly 11, the ram assembly 12, the drive mechanism 14 and an aligned forward module 150. That is, the unitary forward mounting body 52 and a number of coupled components 26 are configured as an aligned forward module 150. The aligned forward module 150 is coupled, directly coupled, removably coupled, or fixed to the frame assembly forward end 13. It is understood that the aligned forward module 150 is aligned with the ram assembly 12 during installation. Thereafter, however, the number of the coupled components 26 do not need to be, and therefore are not, aligned or adjusted to be aligned with the ram assembly 12 or any other element of the bodymaker. Further, in an exemplary embodiment, the aligned forward module 150 is a complete aligned forward module 152.

Figure 23:
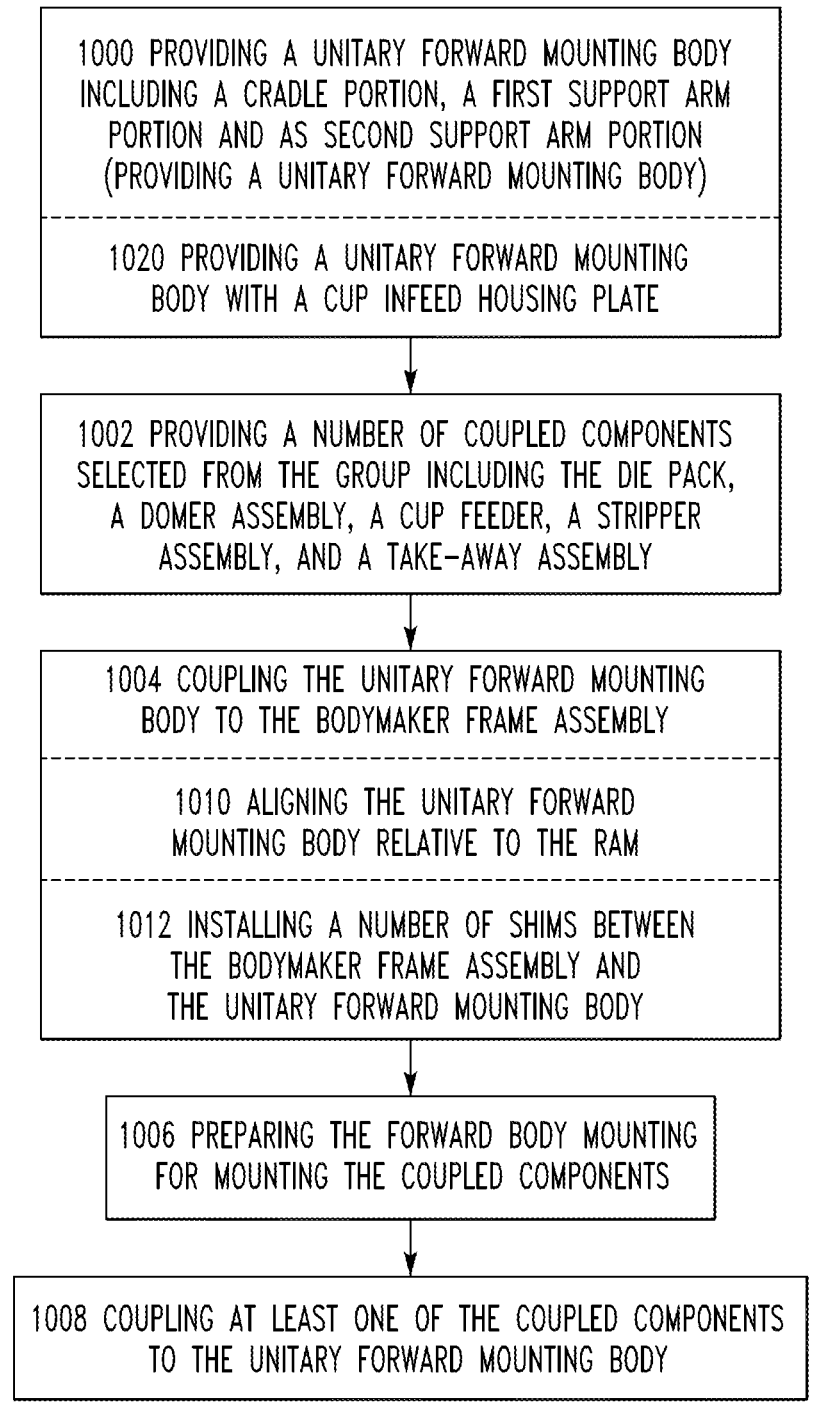
FIG. 23 is a flowchart showing a method of installing a forward assembly.

The forward assembly 48 is installed by different methods as described below. The first disclosed method does not include an aligned forward module 150. That is, in the first method detailed below, the unitary forward mounting body 52 is coupled to the frame assembly 11 before a number of the coupled components 26 are coupled thereto. The second method disclosed below utilizes an aligned forward module 150. Initially, however, it is noted that the problems stated above are solved by eliminating various steps required in the prior art. Thus, a number of disclosed and claimed elements of the method include the lack of selected procedures. That is, as shown in FIG. 23, the method of installing a forward assembly 48 on a bodymaker frame assembly 11 includes the following: providing 1000 a unitary forward mounting body 52 including a cradle portion 54, a first support arm portion 56 and a second support arm portion 58, wherein the cradle portion has a forward side 60, a rear side 62, a right side 64, and a left side 66, the first support arm portion 56 disposed at the cradle portion right side 64, and the second support arm portion 58 disposed at the cradle portion left side 66 (hereinafter, "providing 1000 a unitary forward mounting body 52"), providing 1002 a number of coupled components 26 selected from the group including the die pack 16, a domer assembly 18, a cup feeder 20, a stripper assembly 22, and a take-away assembly 24, coupling 1004 the unitary forward mounting body 52 to the bodymaker frame assembly 11, preparing 1006 the unitary forward mounting body 52 for mounting the coupled components 26, coupling 1008 at least one of the coupled components 26 to the unitary forward mounting body 52.

Coupling 1004 the unitary forward mounting body 52 to the bodymaker frame assembly 11 includes aligning 1010 the unitary forward mounting body 52 relative to the ram assembly 12. Aligning 1010 the unitary forward mounting body 52 relative to the ram assembly 12 includes installing 1012 a number of shims (not shown) between the bodymaker frame assembly 11 and the unitary forward mounting body 52. It is noted that, in the prior art, a cradle (not shown) is coupled to the bodymaker frame assembly 11 and support arms (not shown) are coupled thereto. Such support arms are aligned using shims or similar constructs. By providing the unitary forward mounting body 52, however, the disclosed and claimed method does not include aligning elements thereof with shims. Thus, preparing 1006 the unitary forward mounting body 52 for mounting the coupled components 26 does not include aligning the cradle portion 54 and either of the first support arm portion 56 or the second support arm portion 58 relative to each other. As used herein, any recitation of "does not include" means that the recited action does not occur either as part of the identified action or during any other action of the installation process. Thus, for example, "preparing 1006 the unitary forward mounting body 52 for mounting the coupled components 26" does not include "aligning the cradle portion 54 and either of the first support arm portion 56 or the second support arm portion 58 relative to each other" means that at no time during the installation process are the cradle portion 54 and either of the first support arm portion 56 or the second support arm portion 58 aligned relative to each other. Similarly, coupling 1004 the unitary forward mounting body 52 to the bodymaker frame assembly 11 does not include installing any shims between the cradle portion 54 and either of the first support arm portion 56 or the second support arm portion 58.

In an exemplary embodiment, the unitary forward mounting body 52 includes a cup infeed housing plate 126. Thus, providing 1000 a unitary forward mounting body 52 includes providing 1020 a unitary forward mounting body with a cup infeed housing plate 126. In this embodiment, coupling 1004 the unitary forward mounting body 52 to the bodymaker frame assembly 11 does not include aligning the cradle portion 54 and the cup infeed housing plate 126. Similarly, coupling 1004 the unitary forward mounting body 52 to the bodymaker frame assembly 11 does not include installing any shims between the cradle portion 54 and the cup infeed housing plate 126.

Figure 24:
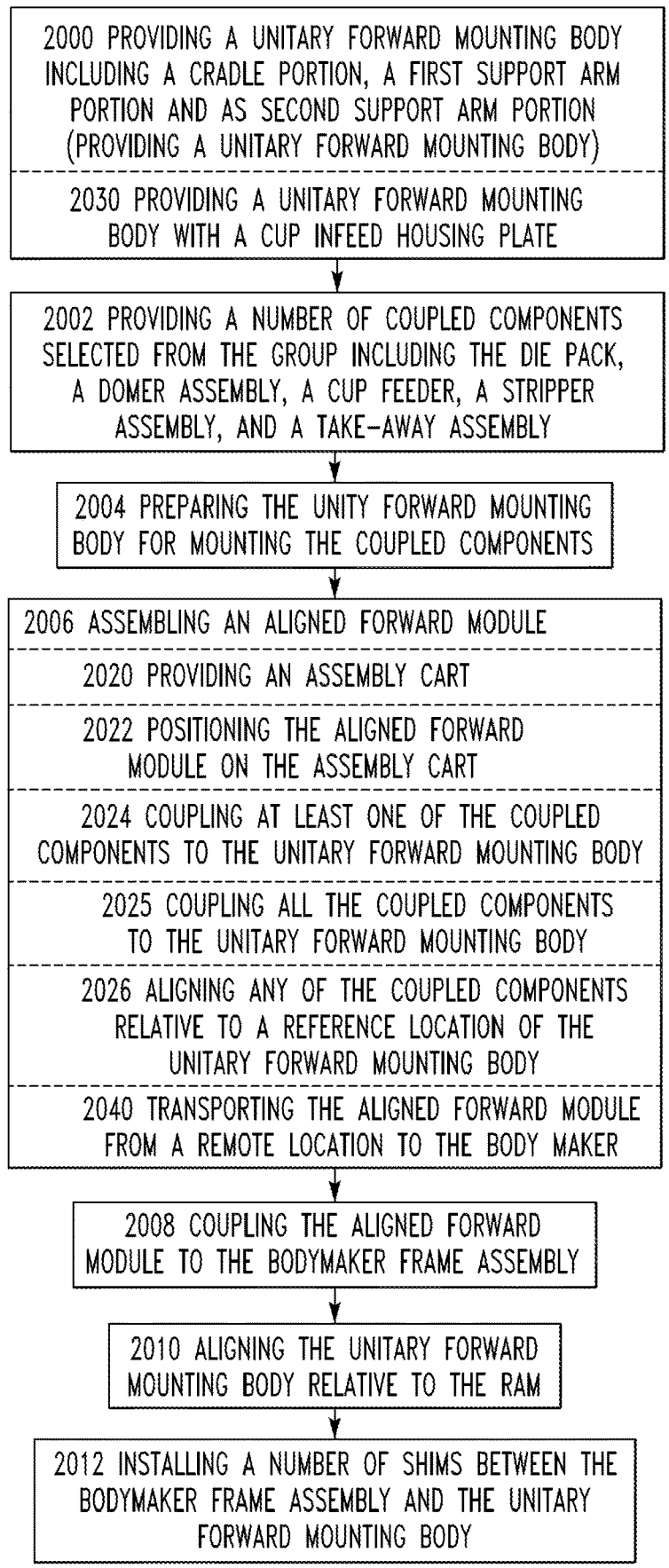
FIG. 24 is a flowchart showing another method of installing a forward assembly.

In another embodiment, as shown in FIG. 24, the method of installing a forward assembly 48 on a bodymaker frame assembly 11 provides the forward assembly 48 as an aligned forward module 150 or as a complete aligned forward module 152. In this embodiment, assembling an aligned forward module 150, as well as assembling the aligned forward module 150 at a location that is remote from the bodymaker 10, solves the problems stated above.

This embodiment includes the following: providing 2000 a unitary forward mounting body 52 including a cradle portion 54, a first support arm portion 56 and a second support arm portion 58, wherein the cradle portion has a forward side 60, a rear side 62, a right side 64, and a left side 66, the first support arm portion 56 disposed at the cradle portion right side 64, and the second support arm portion 58 disposed at the cradle portion left side 66 (hereinafter, "providing 2000 a unitary forward mounting body 52"), providing 2002 a number of coupled components 26 selected from the group including the die pack 16, a domer assembly 18, a cup feeder 20, a stripper assembly 22, and a take-away assembly 24, preparing 2004 the unitary forward mounting body 52 for mounting the coupled components 26, assembling 2006 an aligned forward module 150, and coupling 2008 the aligned forward module 150 to the bodymaker frame assembly 11.

In this embodiment, assembling 2006 the aligned forward module 150 includes providing 2020 an assembly cart 6 (shown schematically), positioning 2022 the aligned forward module 150 on the assembly cart 6, coupling 2024 at least one of the coupled components 26 to the unitary forward mounting body 52, and aligning 2026 any of the coupled components 26 relative to a reference location of the unitary forward mounting body 52. It is noted that once the coupled components 26 are coupled to, and aligned relative to a reference location of the unitary forward mounting body 52, the unitary forward mounting body 52 and the coupled components 26 form the aligned forward module 150. That is, it is understood that "aligning . . . relative to a reference location," as used herein, means that the coupled components 26 are positioned so that, when the unitary forward mounting body 52 is coupled to the frame assembly 11, the coupled components 26 are aligned with, or otherwise properly positioned relative to, the ram assembly 12. Further, assembling 2006 the aligned forward module 150 does not include installing any shims between the cradle portion 54 and either of the first support arm portion 56 or the second support arm portion 58.

Figure 2:
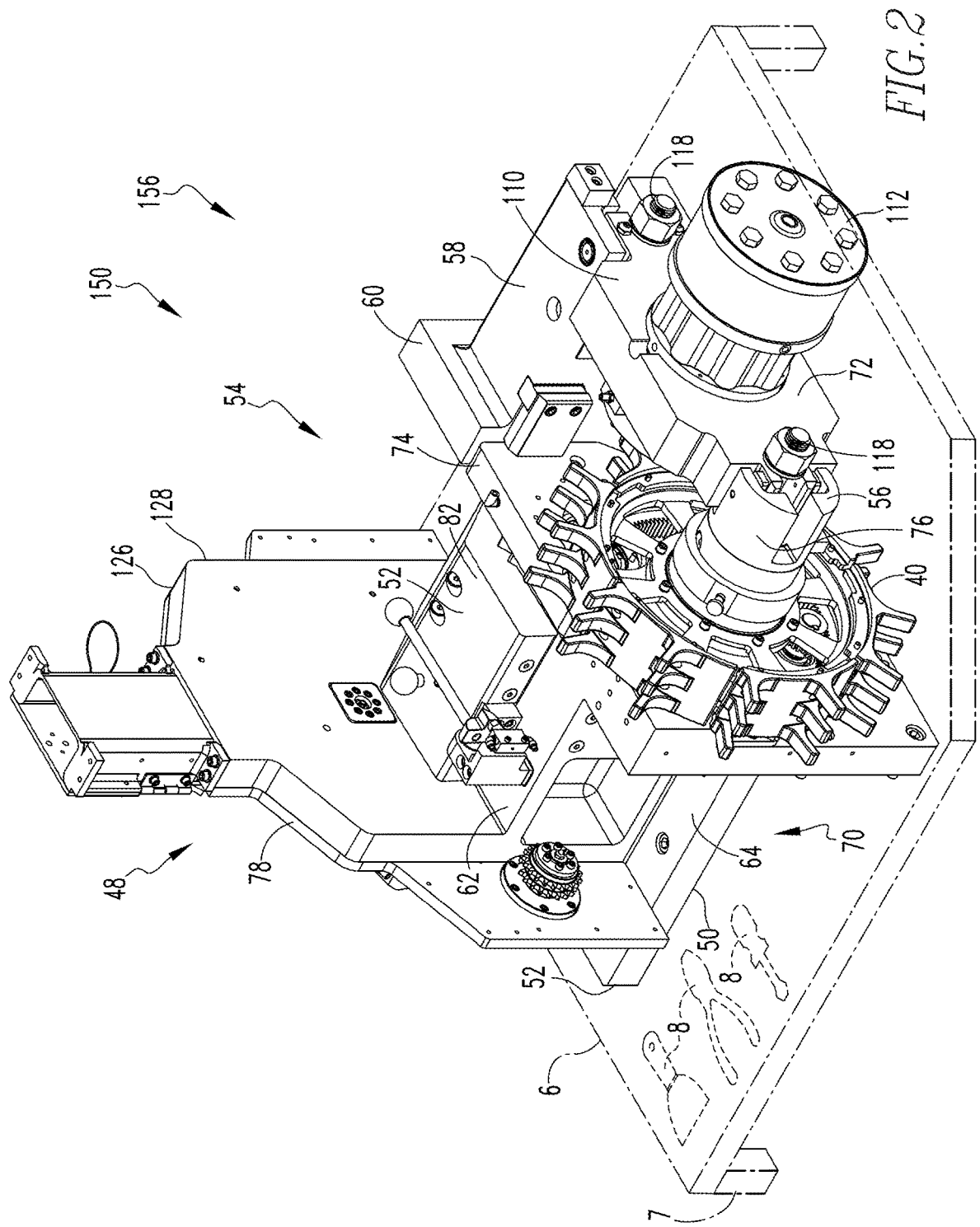
FIG. 2 is an isometric view of a forward assembly.
Figure 3:
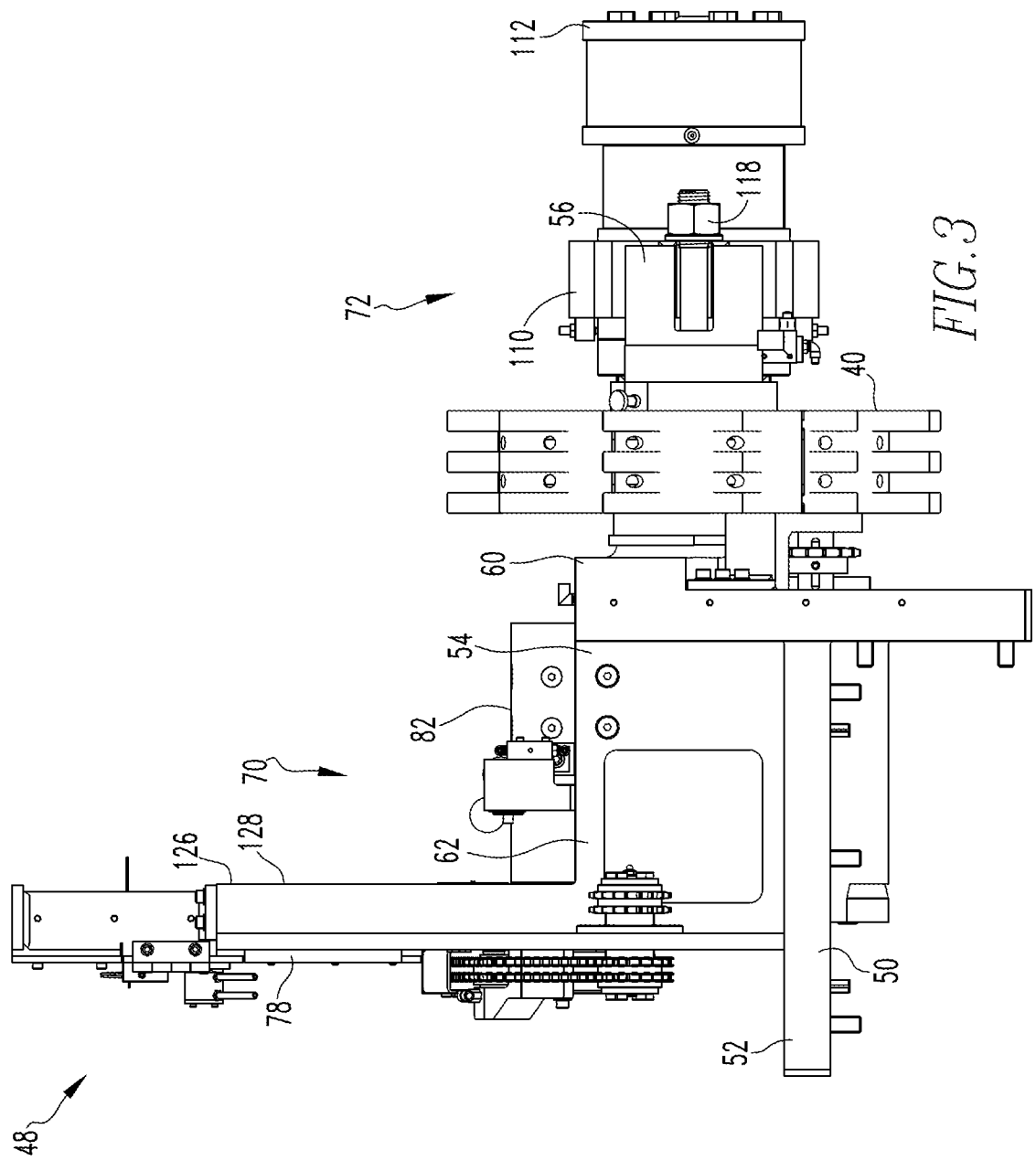
FIG. 3 is a side view of a forward assembly.
Figure 4:
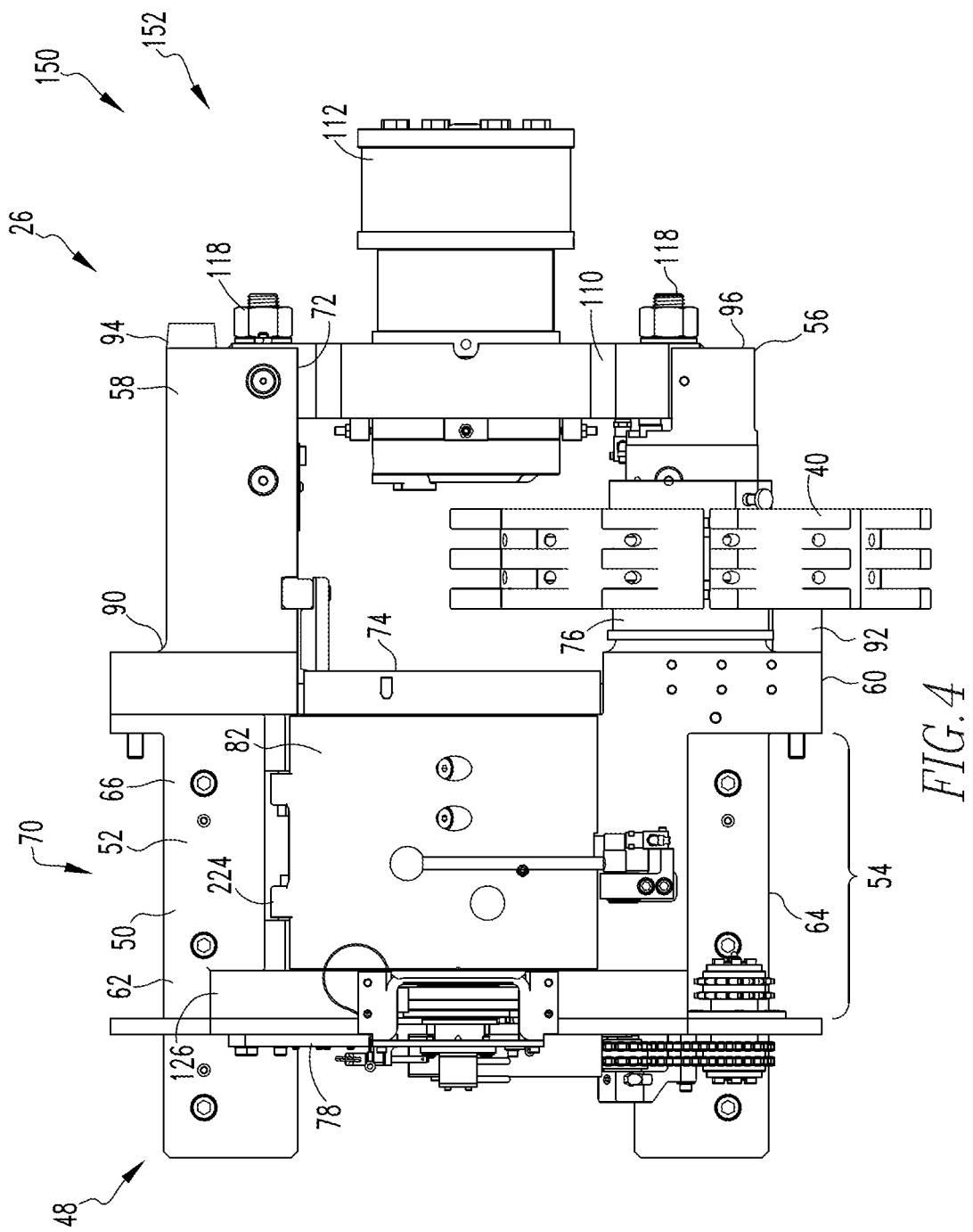
FIG. 4 is a top view of a forward assembly.
Figure 5:
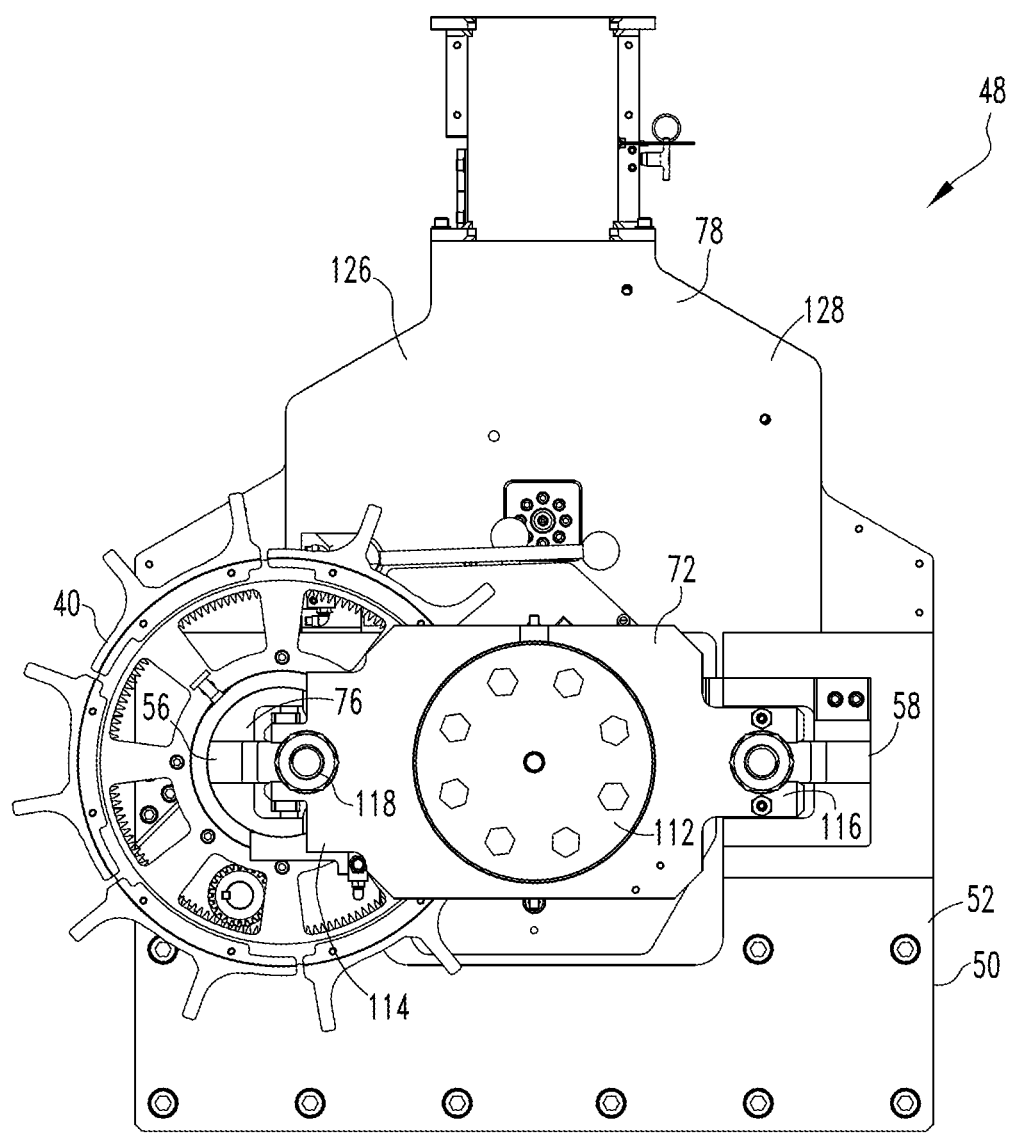
FIG. 5 is a front view of a forward assembly.
Figure 6:
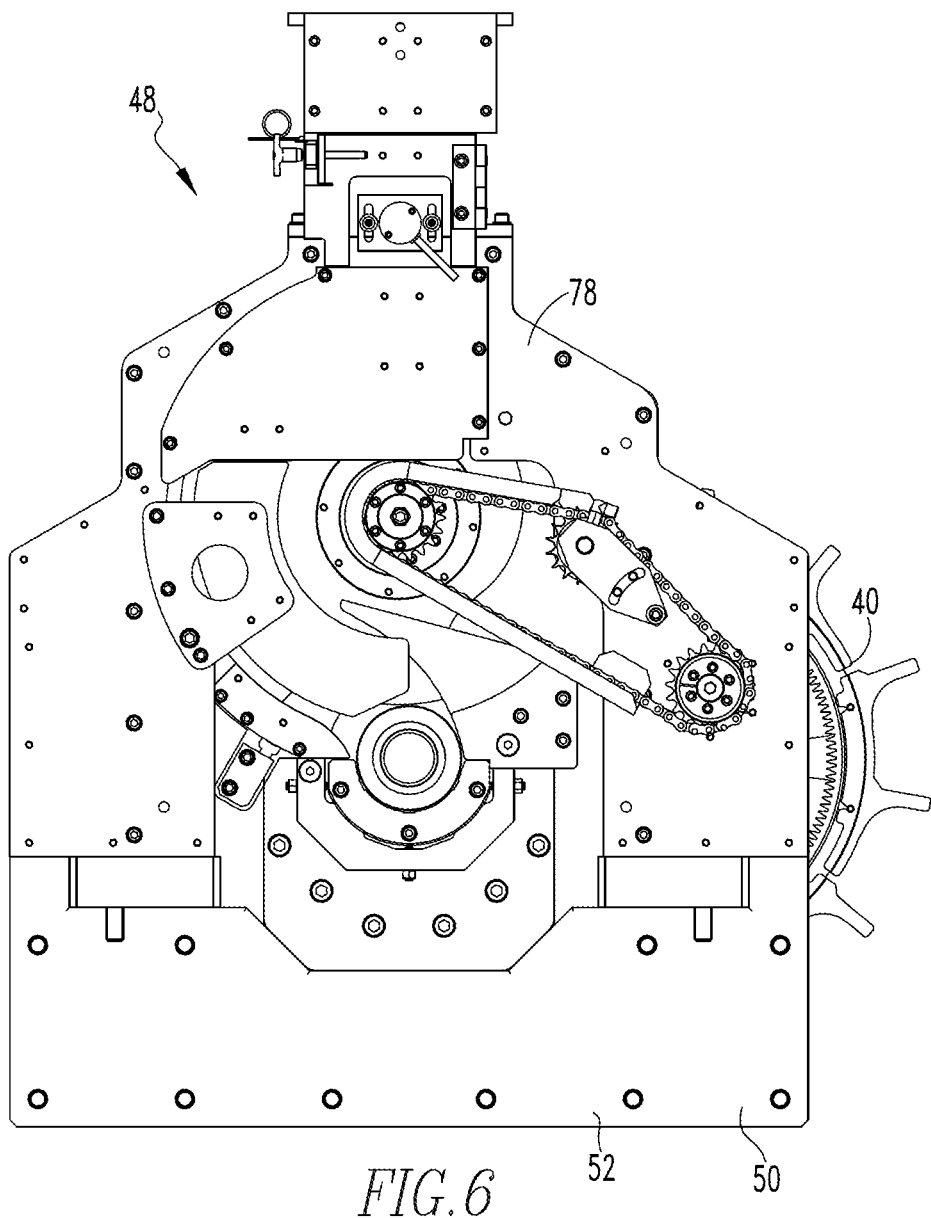
FIG. 6 is a rear view of a forward assembly.

As used herein, an "assembly cart" is a cart structured to support the unitary forward mounting body 52. In an exemplary embodiment, the assembly cart 6 includes a support mount 7 and a number of alignment tools 8 (FIG. 2, shown schematically). The assembly cart support mount 7 is structured to support the unitary forward mounting body 52 in an installation orientation (i.e., the orientation of the unitary forward mounting body 52 as it is coupled to the frame assembly 11). The assembly cart alignment tools 8 are the tools required to align the coupled components 26 in a desired alignment relative to a selected point of the unitary forward mounting body 52.

Further, in one embodiment, coupling 2024 at least one of the coupled components 26 to the unitary forward mounting body 52 includes coupling 2025 all the coupled components 26 to the unitary forward mounting body 52. In this embodiment, the aligned forward module 150 is a complete aligned forward module 152.

Coupling 2008 the aligned forward module 150 to the bodymaker frame assembly 11 includes aligning 2010 the unitary forward mounting body 52 relative to the ram assembly 12. Aligning 2010 the unitary forward mounting body 52 relative to the ram assembly 12 includes installing 2012 a number of shims (not shown) between the bodymaker frame assembly 11 and the unitary forward mounting body 52. It is noted that, in the prior art, a cradle (not shown) is coupled to the bodymaker frame assembly 11 and support arms (not shown) are coupled thereto. Such support arms are aligned using shims or similar constructs. By providing the unitary forward mounting body 52, however, the disclosed and claimed methods do not include aligning additional constructs with shims. Thus, aligning 2010 the unitary forward mounting body 52 relative to the ram assembly 12 does not include installing any shims between the cradle portion 54 and either of the first support arm portion 56 or the second support arm portion 58.

In an exemplary embodiment, the unitary forward mounting body 52 includes a cup infeed housing plate 126. Thus, providing 2000 a unitary forward mounting body 52 includes providing 2030 a unitary forward mounting body with a cup infeed housing plate 126. In this embodiment, preparing 2004 the unitary forward mounting body 52 for mounting the coupled components 26 does not include aligning the cradle portion 54 and the cup infeed housing plate 126. Similarly, preparing 2004 the unitary forward mounting body 52 for mounting the coupled components 26 does not include installing any shims between the cradle portion 54 and the cup infeed housing plate 126.

Further, in an exemplary embodiment, assembling 2006 the aligned forward module 150 occurs at a remote location. As used herein, a "remote location" is a location not adjacent the bodymaker frame assembly 11. That is, the aligned forward module 150 is assembled elsewhere, e.g., a workroom. This means that the space around the bodymaker 10 is not occupied with technicians assembling the unitary forward mounting body 52 and the coupled components 26. This solves the problems stated above. Further, in this embodiment, assembling 2006 the aligned forward module 150 includes transporting 2040 the aligned forward module 150 from a remote location to the bodymaker 10.

Further, in an exemplary embodiment, die pack mounting 70 is structured to provide a work space wherein the die pack 16 is in a "maintenance configuration." As used herein, a "maintenance configuration" is when an element or assembly is supported more than 38.0 inches above the floor or other substrate, and, wherein the element or assembly is generally exposed, i.e., is generally not enclosed, so that a technician has easy access to most portions of the element or assembly. In an exemplary embodiment, the die pack mounting door assembly 82 is movably coupled to the die pack mounting bed 80 and is structured to, and does, move between an open, first position, wherein the die pack mounting door assembly 82 is structured to support a die pack 16 in a maintenance configuration, and, a closed, second position, wherein the die pack mounting door assembly 82 fixes the die pack 16 in a selected position. Stated alternately, the die pack mounting door assembly 82 is movable between the first and second positions.

Figure 11:
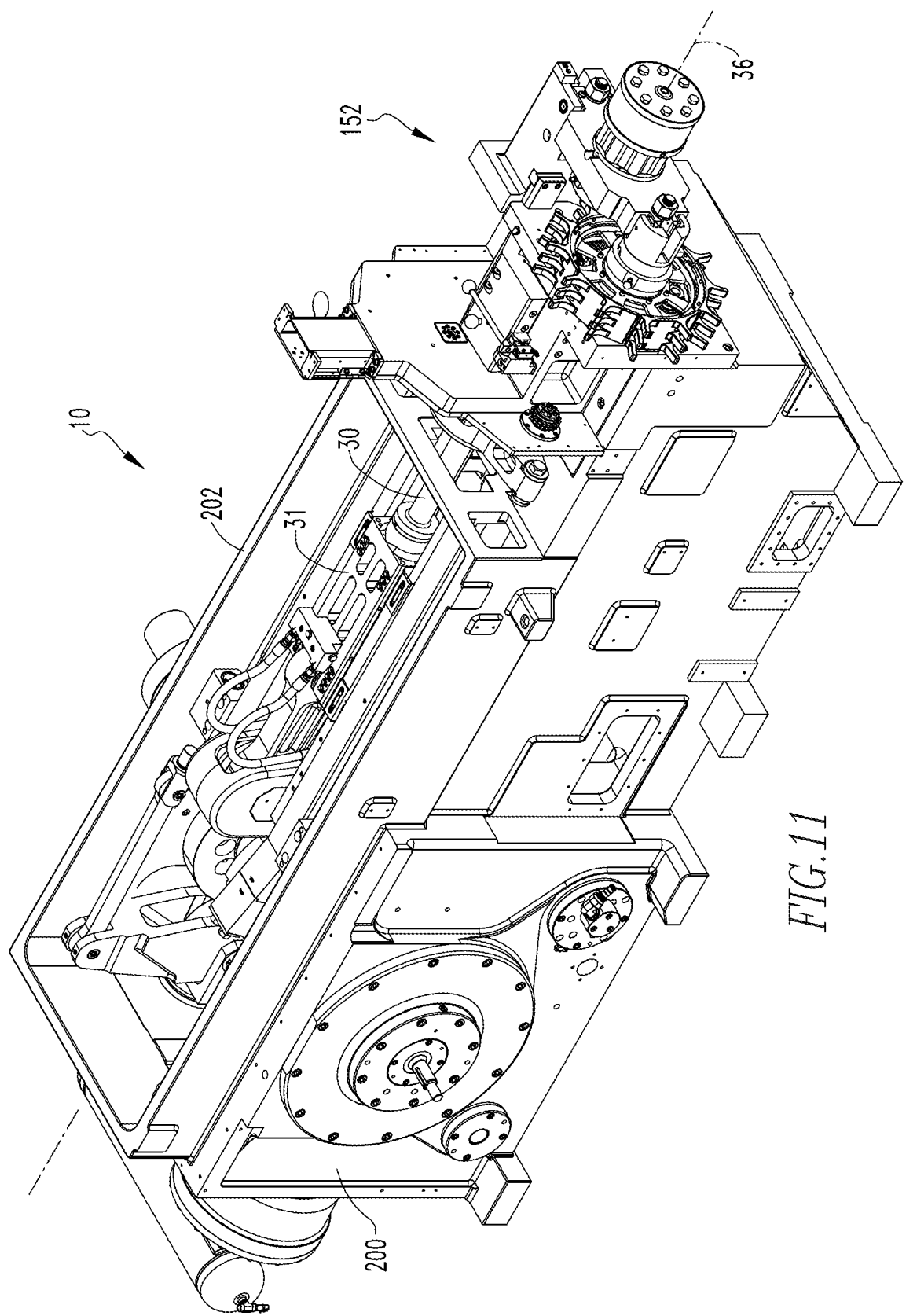
FIG. 11 is an isometric view of a bodymaker.

As shown in FIG. 11, a bodymaker 10 has a "power take-off side" 200 and an "operator side" 202. Generally, workers are intended to work on the "operator side" 202 and not on the "power take-off side" 200 of a bodymaker 10. The "power take-off side" 200 is the side of the bodymaker 10 that includes a guarded flywheel or similar covered moving elements. The "operator side" 202 is the side of the bodymaker 10 that includes the controls, displays, or other elements with which an operator interacts. The "power take-off" 200 and the "operator side" 202 are on opposite sides of a bodymaker 10 longitudinal axis that is coextensive with the ram assembly 12 longitudinal axis. The names "power take-off side" 200 and "operator side" 202 are also applicable to other elements of the bodymaker 10, e.g., the frame assembly 11 has a "power take-off side" 200 and an "operator side" 202.

In an exemplary embodiment, and as shown in FIG. 7, the die pack mounting bed 80 also has a "power take-off side" 210 and the "operator side" 212. The die pack mounting bed 80 includes a die pack mounting hinge first component 220 disposed on the die pack mounting bed operator side 212. As shown, the die pack mounting hinge first component 220 is disposed on the upper side of the die pack mounting bed operator side 212. As shown in FIGS. 9 and 10, the die pack mounting door assembly 82 includes a die pack mounting hinge second component 222 that is structured to be, and is, movably/rotatably coupled to the die pack mounting hinge first component 220. When coupled, the die pack mounting hinge first component 220 and the die pack mounting hinge second component 222 form a die pack mounting hinge assembly 224. The die pack mounting hinge assembly 224 has an axis of rotation that is generally parallel to the ram longitudinal axis.

In this configuration, when the die pack mounting door assembly 82 is in the second position, the die pack mounting door assembly 82 is disposed on the die pack mounting bed operator side 212. That is, the die pack mounting door assembly 82 is not disposed in the die pack mounting bed power take-off side 210 and is positioned to be used as a workbench structured to support a die pack 16 prior to insertion into the die pack mounting 70. That is, in this configuration, the die pack mounting door assembly 82 is structured to support the die pack 16 in the maintenance configuration. This solves the problems stared above.

In an exemplary embodiment, and when viewed along the ram assembly 12 longitudinal axis, the die pack mounting 70 generally has a hexagonal shape. In this embodiment, the die pack mounting door assembly 82 defines two sides of the hexagonal shape. That is, the die pack mounting door assembly 82 includes a body 230 with a generally planar, generally rectangular first portion 232 and a generally planar, generally rectangular second portion 234. The die pack mounting door assembly body 230 also has a forward side 233 and a rear side 235. The die pack mounting door assembly body 230 is, in an exemplary embodiment, a unitary body. The die pack mounting door assembly body first portion 232 and the die pack mounting door assembly body second portion 234 share a common longitudinal side. The planes of the die pack mounting door assembly body first portion 232 and the die pack mounting door assembly body second portion 234 are at an angle of about 60 degrees.

Further, the die pack mounting door assembly body 230 and the die pack mounting door assembly body first portion 232 have an inner side 236 and an outer side 238 (that is, reference numbers 236 and 238, as used herein, collectively identify the inner/outer sides of both the die pack mounting door assembly body 230 and the die pack mounting door assembly body first portion 232). In the exemplary embodiment shown, the die pack mounting door assembly body first portion inner side 236 is the side that faces the die pack mounting bed 80, or generally downwardly, when the die pack mounting door assembly 82 is in the second position. When the die pack mounting door assembly 82 is in the first position, the die pack mounting door assembly body first portion inner side 236 has rotated about 180° degrees relative to the second position. Thus, when the die pack mounting door assembly 82 is in the first position, the die pack mounting door assembly body first portion inner side 236 faces generally upwardly and the plane of the die pack mounting door assembly body first portion 232 is generally horizontal. As set forth above, in this configuration, the die pack mounting door assembly 82 is structured to support the die pack 16 in the maintenance configuration.

In an exemplary embodiment, the die pack 16 has an outer contour. As used herein, the die pack 16 "outer contour" is the general contour of the bulk of the die pack 16 and does not include any localized protrusions or orienting features. In the embodiment shown, the die pack 16 has a generally cylindrical outer contour. In an exemplary embodiment, the at least one of the die pack mounting door assembly body inner side 236 or the die pack mounting door assembly body outer side 238 includes a maintenance contour. As used herein, a "maintenance contour" is a portion of the die pack mounting door assembly 82 shaped to substantially correspond to the die pack 16 outer contour. Further, as used herein, a "maintenance contour" excludes a substantially flat or planar surface. Thus, if the die pack 16 outer contour is generally flat, a "maintenance contour" includes a recess or cavity sized and shaped to correspond to the die pack 16 outer contour. Thus, when a die pack 16 is disposed on a "maintenance contour," the die pack 16 is maintained in position by gravity and lateral force cannot cause the die pack 16 to slide off the "maintenance contour."

In an exemplary embodiment, the die pack mounting door assembly 82 includes a resilient member 250. As shown, the die pack mounting door assembly resilient member 250 is disposed on the die pack mounting door assembly body inner side 236. Further, the die pack mounting door assembly resilient member 250 defines the maintenance contour. Thus, for example, if the die pack 16 outer contour is generally cylindrical, the die pack mounting door assembly resilient member 250 defines a maintenance contour that is arcuate having a curvature that substantially corresponds to the die pack 16 generally cylindrical outer contour. It is noted that, when the die pack mounting door assembly 82 is in the second position, the die pack mounting door assembly resilient member 250 is structured to, and does, bias the die pack 16 against the die pack mounting bed 80 and any orienting elements such as spacers (not shown).

Further, in an exemplary embodiment, the die pack mounting door assembly 82 does not include any fluid fittings. As used herein, a "fluid fitting" is a coupling device structured to be coupled to a fluid conduit or hose. The die pack mounting door assembly 82, and, as shown, the die pack mounting door assembly body 230, defines a number of coolant passages 260. As is known, the die pack mounting door assembly body coolant passages 260 are structured to provide fluid communication to coolant passages (not shown) in the die pack 16. To avoid the use of fluid fittings on the die pack mounting door assembly 82, the die pack mounting bed 80 also defines a number of coolant passages 262 (FIG. 7). Each of the die pack mounting door assembly body coolant passages 260 and the die pack mounting bed coolant passages 262 have an inlet 270 and an outlet 272. That is, reference number 270 and 272 generically identify an inlet 270 or an outlet 272 for an associated coolant passage 260, 262. Each die pack mounting door assembly body coolant passage outlet 272 is disposed on the die pack mounting door assembly body inner side 236.

As shown, in an exemplary embodiment, a number of die pack mounting door assembly body coolant passages 260 extend in a direction that is generally perpendicular to the axis of rotation of the die pack mounting hinge assembly 224. In this configuration, a number of the die pack mounting door assembly body coolant passages inlets 270 are disposed on a surface of the die pack mounting door assembly body 230 that abuts the die pack mounting bed 80. Further, a number of die pack mounting bed coolant passages outlets 272 are positioned so that, when the die pack mounting door assembly 82 is in the second position, each die pack mounting bed coolant passages outlet 272 is in fluid communication with an associated die pack mounting door assembly body coolant passages inlet 270. In this configuration, a coolant is able to flow through the die pack mounting bed coolant passages 262, through the die pack mounting door assembly body coolant passages 260 and into the die pack 16 without passing through a fluid fitting on the die pack mounting door assembly 82. This solves the problems noted above.

As shown, in an exemplary embodiment, the die pack mounting door assembly body coolant passages 260 are created by machining or drilling generally straight passages into the die pack mounting door assembly body 230. In this configuration, the die pack mounting door assembly 82 also includes machining portals 276. As shown, each die pack mounting door assembly machining portal 276 is sealed by a die pack mounting door assembly plug 278. That is, the die pack mounting door assembly 82 includes a number of plugs 278 and each plug 278 is disposed in an associated coolant passage machining portal 276. It is understood that the use of other manufacturing techniques, such as, but not limited to, 3D printing and a lost wax process, can create a die pack mounting door assembly 82 without each die pack mounting door assembly machining portal 276 (embodiment not shown).

Figure 25:
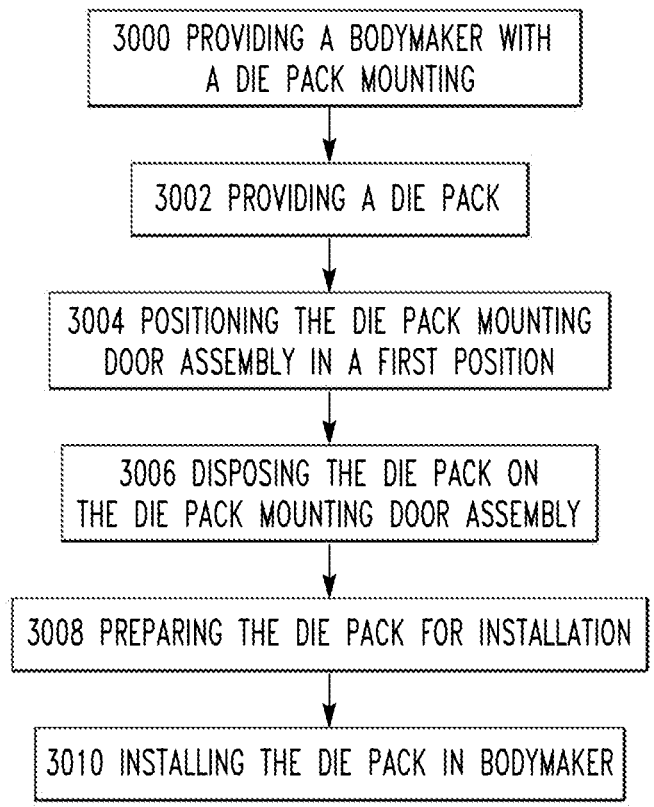
FIG. 25 is a flowchart showing a method of installing a die pack in a die pack mounting.

Further, as shown in FIG. 25, a method of installing the die pack 16 in a die pack mounting 70, or the bodymaker 10, includes providing 3000 a bodymaker with a die pack mounting 70 including a die pack mounting bed 80, a die pack mounting door assembly 82, the die pack mounting door assembly 82 movably coupled to the die pack mounting bed 80, wherein the die pack mounting door assembly 82 is movable between an open, first position, wherein the die pack mounting door assembly 82 is structured to support a die pack 16 in a maintenance configuration, and, a closed, second position, wherein the die pack mounting door assembly 82 fixes the die pack 16 in a selected position, providing 3002 a die pack 16, positioning 3004 the die pack mounting door assembly 82 in the first position, disposing 3006 the die pack 16 on the die pack mounting door assembly 82, preparing 3008 the die pack 16 for installation, and installing 3010 the die pack in bodymaker 10. Further, installing 3010 the die pack in bodymaker 10 does not include coupling fluid hoses to the die pack mounting door assembly 82. As used herein, a "hose" is a conduit defined by a flexible body that is independent from other elements of the bodymaker 10. That is, a conduit defined by a rigid element of the bodymaker 10, such as, but not limited to the unitary forward mounting body 52, is not a "hose."

Further, in an exemplary embodiment, the ram assembly 12 is structured to adjust the range of the ram assembly body 30, that is, the maximum penetration of the ram assembly body 30 (or punch 38), through the die pack 16 without substantially decoupling a substantial number of components. That is, as used herein, the "range" of the ram assembly body means the maximum penetration of the ram assembly body (or punch), through the die pack, i.e., how far the distal end of the ram assembly body 30 (or the punch 38) moves past the end of the die pack 16. That is, as used herein, the "range" of the ram assembly body 30 does not mean the distance traveled by the ram assembly body as it reciprocates.

Figure 12:
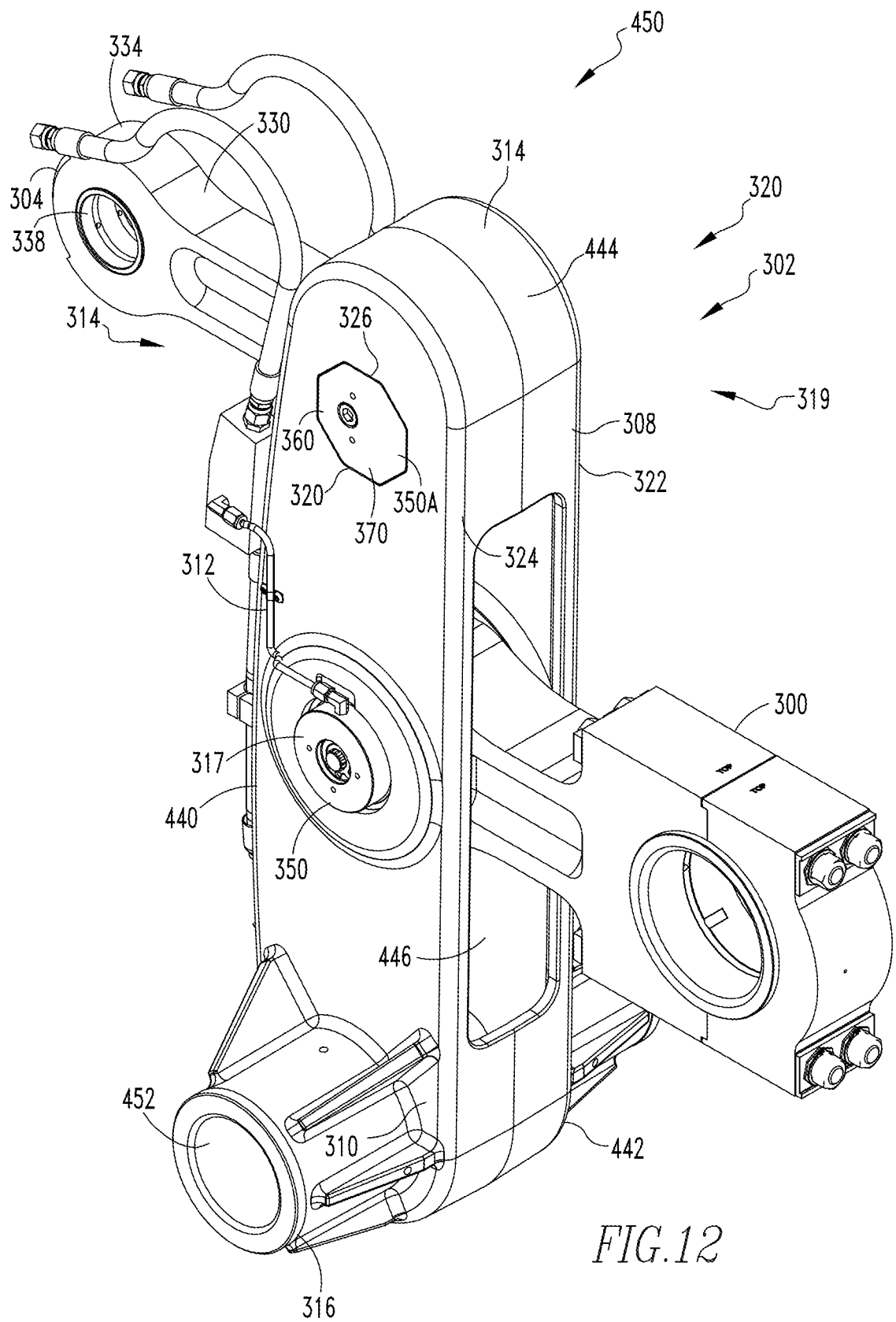
FIG. 12 is an isometric view of a swing lever assembly.
Figure 18:
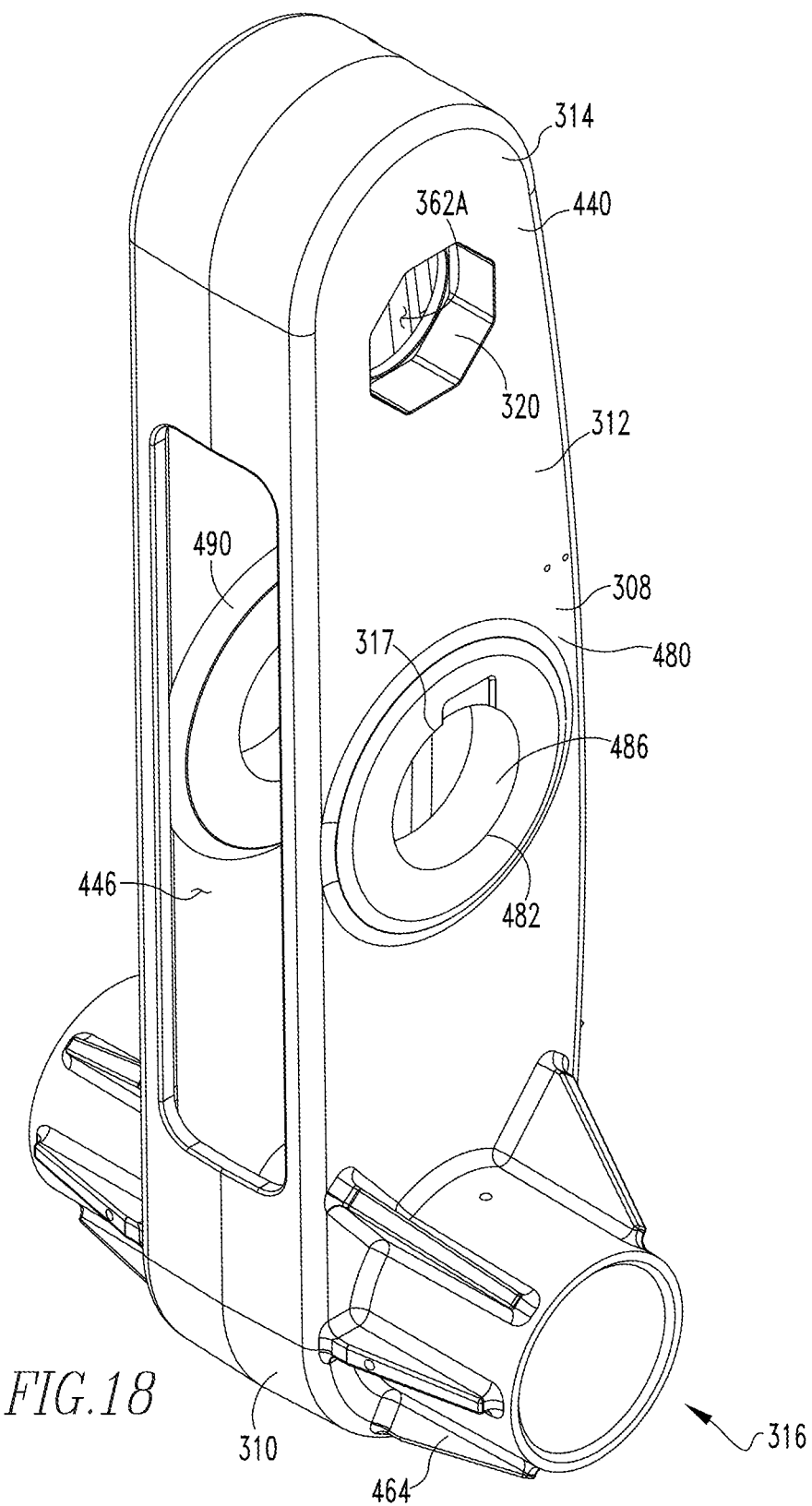
FIG. 18 is a first isometric view of a swing lever.
Figure 19:
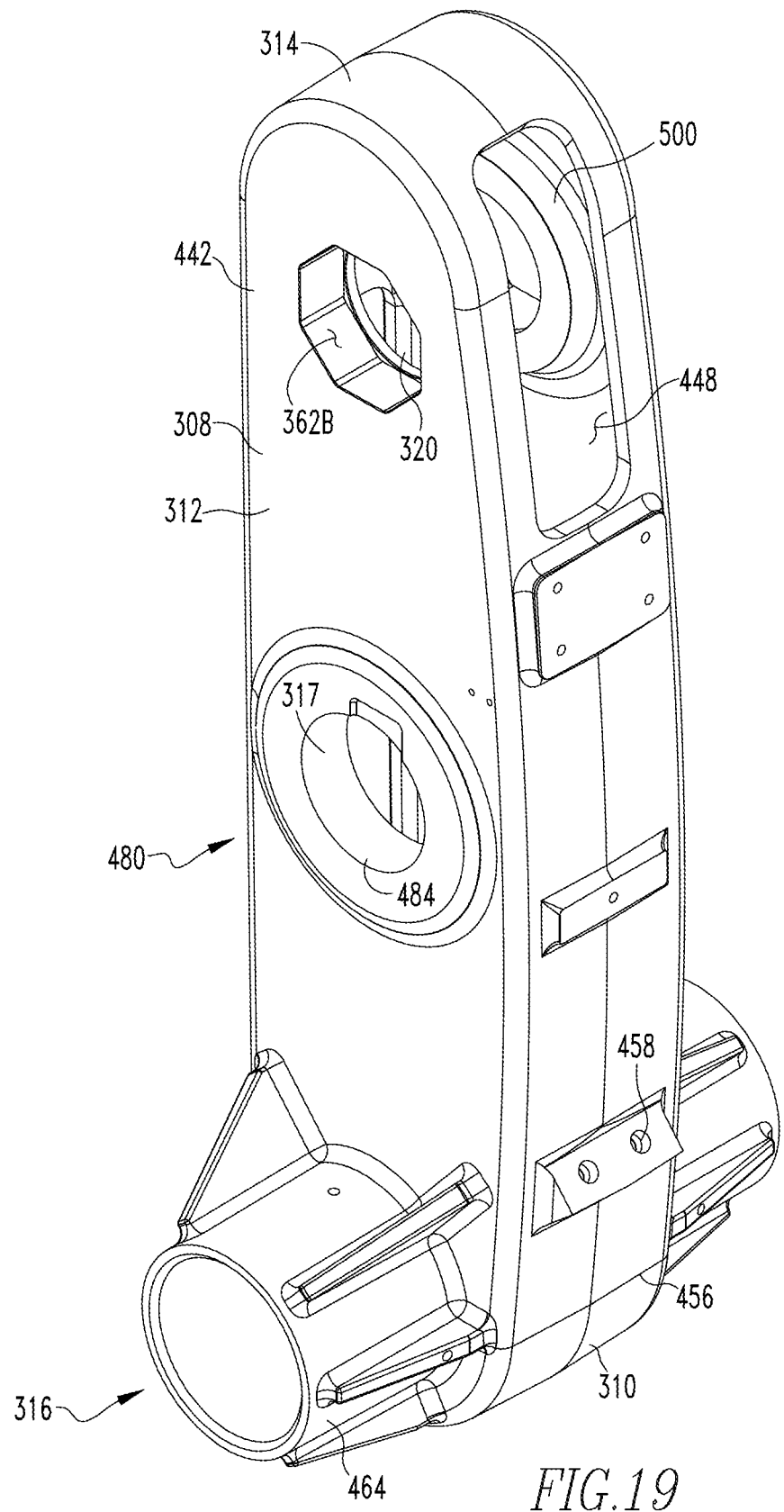
FIG. 19 is a first isometric view of a swing lever.

In this embodiment, elements of the drive mechanism 14 are also considered to be elements of the ram assembly 12. That is, as is known, the drive mechanism 14 includes a rotating element such as, but not limited to an output shaft and/or a flywheel (not numbered). The ram assembly 12 includes a primary connection rod 300 (FIG. 1), an elongated swing lever 302 (it is noted that the swing lever 302 is an assembly, as discussed below), and a secondary connection rod 304 (which, hereinafter, may also be identified as "connection rod" 304). The drive mechanism 14 is rotatably and operatively coupled to the primary connection rod 300. The primary connection rod 300 is rotatably and operatively coupled to the swing lever 302. The swing lever 302 is pivotally coupled to the frame assembly 11. That is, as shown in FIGS. 12, the swing lever 302 includes an elongated, unitary body 308 (discussed in detail below) with a first end 310, a medial portion 312, and a second end 314. The swing lever 302 extends generally vertically with the swing lever body first end 310 being the lower end. The swing lever body first end 310 is pivotally coupled to the frame assembly 11 with the pivot coupling axis of rotation extending generally perpendicular to the ram assembly body longitudinal axis 36. Thus, the swing lever body first end 310 defines a pivotal coupling 316. The primary connection rod 300 is rotatably and operatively coupled to the swing lever body medial portion 312. Thus, the swing lever body medial portion 312 defines a rotational coupling 317. As the primary connection rod 300 moves, the primary connection rod 300 imparts reciprocal pivoting, or rocking, motion to the swing lever 302. That is, the swing lever 302 moves between a retracted, first position and a forward, second position.

The swing lever body second end 314 defines a yoke 319 with two aligned openings that are a rotational coupling 320. That is, as used herein, a "yoke" means a construct including two spaced elements, each of which includes an opening and wherein the openings are aligned about a common axis. In an exemplary embodiment, the swing lever body second end yoke 319 includes a first lateral tine 322 and a second lateral tine 324, each having an opening 326, 328, respectively (hereinafter "swing lever body second end yoke openings" 326, 328).

The secondary connection rod 304 includes a body 330 with a first end 332 and a second end 334. Each of the secondary connection rod body first and second ends 332, 334 define an opening, 336, 338, respectively. The ram assembly carriage 31 also defines a yoke with two aligned openings, that are a rotational coupling 340 (FIG. 1) as well as a ram assembly body mounting 342. The swing lever body second end 314 is rotatably, and operatively, coupled to the secondary connection rod first end 332 by a first connection rod rotational coupling assembly 350, hereinafter "connection rod coupling assembly" 350. Similarly, the secondary connection rod second end 334 is rotatably, and operatively, coupled to the ram assembly carriage 31 by a second connection rod rotational coupling assembly 350A. The following description discusses the connection rod coupling assembly 350 between the swing lever body second end 314 and the secondary connection rod first end 332.

It is understood, however, that the same description is applicable to the second connection rod coupling assembly 350A between the secondary connection rod second end 334 and the ram assembly carriage 31. It is further understood that the various secondary connection rod openings 336, 338 and the yoke openings 320, 340 are also part of the connection rod coupling assemblies 350, 350A.

The second connection rod coupling assembly 350A is structured to, and does, adjustably couple the ram assembly 12 to the drive mechanism 14. As used herein, "adjustably couple" means that the range of the ram assembly body 30 can be altered without substantially decoupling a number of substantial components. As used herein, "without decoupling a number of substantial components" means that the elements coupled by the second connection rod coupling assembly 350A are not fully decoupled; i.e., the bearing assembly 372, discussed below, is not fully removed from the secondary connection rod 304.

The swing lever body second end 314 further defines a settable shape mounting first component 360 at the yoke 319. As used herein, a "settable shape mounting [ ] component" means a mounting including components with "rotatably congruent shapes." As used herein, "rotatably congruent shapes" means shapes that can be rotated less that 360 degrees about an axis and appear the same as the original orientation. For example, an equilateral triangle in a first orientation can be rotated 120 degrees about its center to a second orientation which appears the same as the first orientation. All "rotatably congruent shapes" have a center. In an exemplary embodiment, the settable shape mounting first component 360 includes a number of cavities 362 each with a rotatably congruent shape. In an embodiment, the settable shape mounting first component 360 is part of yoke 319, and the settable shape mounting first component cavities 362 are disposed about the swing lever body second end yoke openings 326, 328. Stated alternately, each swing lever body second end yoke openings 326, 328 has an associated settable shape mounting first component cavity 362. The settable shape mounting first component cavities 362, in an exemplary embodiment, are shallow relative to the swing lever body second end yoke openings 326, 328. The settable shape mounting first component 360, in addition to being part of the swing lever body second end 314, is also part of the connection rod coupling assembly 350.

In an exemplary embodiment, as shown in FIGS. 15-17, the connection rod coupling assembly 350A also includes a settable shape mounting second component 370 and a bearing assembly 372. The settable shape mounting second component 370 includes a lateral, primary axis 374. As used herein, a "lateral, primary axis" is a line extending horizontally and perpendicular to a line that extends parallel to the ram assembly body longitudinal axis 36, and, through the center of the settable shape mounting second component 370. The bearing assembly 372 includes a body 380 having a substantially cylindrical outer surface 382 and a center axis 384. The bearing assembly body center axis 384 is offset relative to the settable shape mounting second component primary axis 374. As used herein, "offset" means generally parallel to, but not on the same line. Further, an "offset" element that is structured to be positioned in different configurations relative to another element is an "eccentric" element. That is, in an exemplary embodiment, the bearing assembly 372 is structured to be positioned in different configurations relative to the swing lever body second end 314 and, as such, is an "eccentric" element. Further, it is understood that the settable shape mounting first component 360 and the settable shape mounting second component 370 have corresponding rotatably congruent shapes. That is, if the settable shape mounting first component 360 is a triangle, then the settable shape mounting second component 370 is also a triangle.

In this configuration, the bearing assembly body 380 is structured to be positioned in different locations relative to the settable shape mounting first component 360. That is, in an exemplary embodiment, the settable shape mounting first and second components 360, 370 have a "+" shape. In this configuration, the settable shape mounting second component primary axis 374 is at the vertex of the crossed lines. Further, in this exemplary embodiment, the bearing assembly body 380 is disposed adjacent the distal tip of one of the lines. Thus, the bearing assembly body center axis 384 is not aligned with the settable shape mounting second component primary axis 374. Further, in a first orientation, the bearing assembly body 380 is disposed at the uppermost tip of the "+" shape. The settable shape mounting second component 370 can be rotated ninety degrees so the bearing assembly body 380 is disposed at the leftmost tip of the "+" shape. Thus, the position of the bearing assembly body 380 is structured to be, and is, "set" relative to the settable shape mounting second component primary axis 374. Thus, as used herein, to "set" means that the position of an element, e.g., the bearing assembly body 380, is selectable relative to another element, e.g., the settable shape mounting second component primary axis 374. Thus, as used herein, "settable" means structured to be "set."

In an exemplary embodiment, wherein the swing lever body second end 314 defines a yoke 319, the settable shape mounting first component 360 includes two settable shape mounting first component first cavities 362; one on each side of the yoke. Thus, there is a settable shape mounting first component first cavity 362A and a settable shape mounting first component second cavity 362B with one cavity disposed on each side of the swing lever body second end 314, i.e., one cavity 362A, 362B is disposed on each branch of the yoke. In this embodiment, the settable shape mounting second component 370 includes a first lug 390 and a second lug 392 (collectively "settable shape mounting lugs" 390, 392). Further, in an exemplary embodiment, the settable shape mounting lugs 390, 392 are generally planar. In this embodiment, the plane of each settable shape mounting lug 390, 392 extends generally parallel to the ram assembly body longitudinal axis 36.

Further, the connection rod coupling assembly 350 is under stress when the bodymaker 10 is in operation. As such, thin, extending elements, such as the branches of a "+" shaped rotatably congruent shape are more likely to contend with wear and tear; this is a problem. Accordingly, in an exemplary embodiment, the settable shape mounting lugs 390, 392 are regular convex polygons such as, but not limited to, triangles, squares, pentagons, hexagons, heptagons, octagons, and decagons. Such shapes solve the problem of wear and tear on thin elements. As stated above, the settable shape mounting first component cavities 362 correspond to the shape of the settable shape mounting lugs 390, 392; thus, the settable shape mounting first component cavities 362 are shaped as regular convex polygons such as, but not limited to, triangles, squares, pentagons, hexagons, heptagons, octagons, and decagons. It is understood, and as used herein, the "shape" of a mounting lug 390, 392 and a settable shape mounting first component cavity 362 means the cross-sectional shape of the element in a plane perpendicular to the direction in which a mounting lug 390, 392 is inserted into the settable shape mounting first component cavity 362.

Thus, in an exemplary embodiment, as shown in FIG. 15, the connection rod coupling assembly 350 includes two octagonal, generally planar settable shape mounting lugs 390, 392 that are disposed in a spaced relationship by a bearing mounting 400. That is, the settable shape mounting second component 370 includes a bearing mounting 400. In this embodiment, the bearing mounting includes, in an exemplary embodiment, a first portion 402 and a second portion 404. The settable shape mounting second component bearing mounting first portion 402 is an elongated, generally cylindrical member 406. The longitudinal axis of the bearing mounting first portion cylindrical member 406 extends generally perpendicular to the plane of the settable shape mounting first lug 390. The settable shape mounting second component bearing mounting second portion 404 is also an elongated, generally cylindrical member 408. The longitudinal axis of the bearing mounting second portion cylindrical member 408 extends generally perpendicular to the plane of the settable shape mounting second lug 392. The bearing assembly body 380 is rotatably coupled to the bearing mounting 400.

That is, in an exemplary embodiment, the settable shape mounting second component bearing mounting first portion 402 defines a passage 410, and, the settable shape mounting second component bearing mounting second portion 404 defines a threaded bore 412. Further, the settable shape mounting second component 370 includes a threaded fastener 414. The threaded fastener 414 is disposed partially in the settable shape mounting second component bearing mounting first portion passage 410 and threaded into the settable shape mounting second component bearing mounting second portion threaded bore 412. Thus, the settable shape mounting lugs 390, 392 are coupled by the settable shape mounting second component fastener 414. Further, the bearing assembly body 380 is coupled, or rotatably coupled, to the settable shape mounting second component bearing mounting 400. That is, before the settable shape mounting lugs 390, 392 are coupled by the settable shape mounting second component fastener 414, the bearing assembly body 380 is disposed over the settable shape mounting second component bearing mounting first portion 402 and/or the settable shape mounting second component bearing mounting second portion 404.

Figure 20:
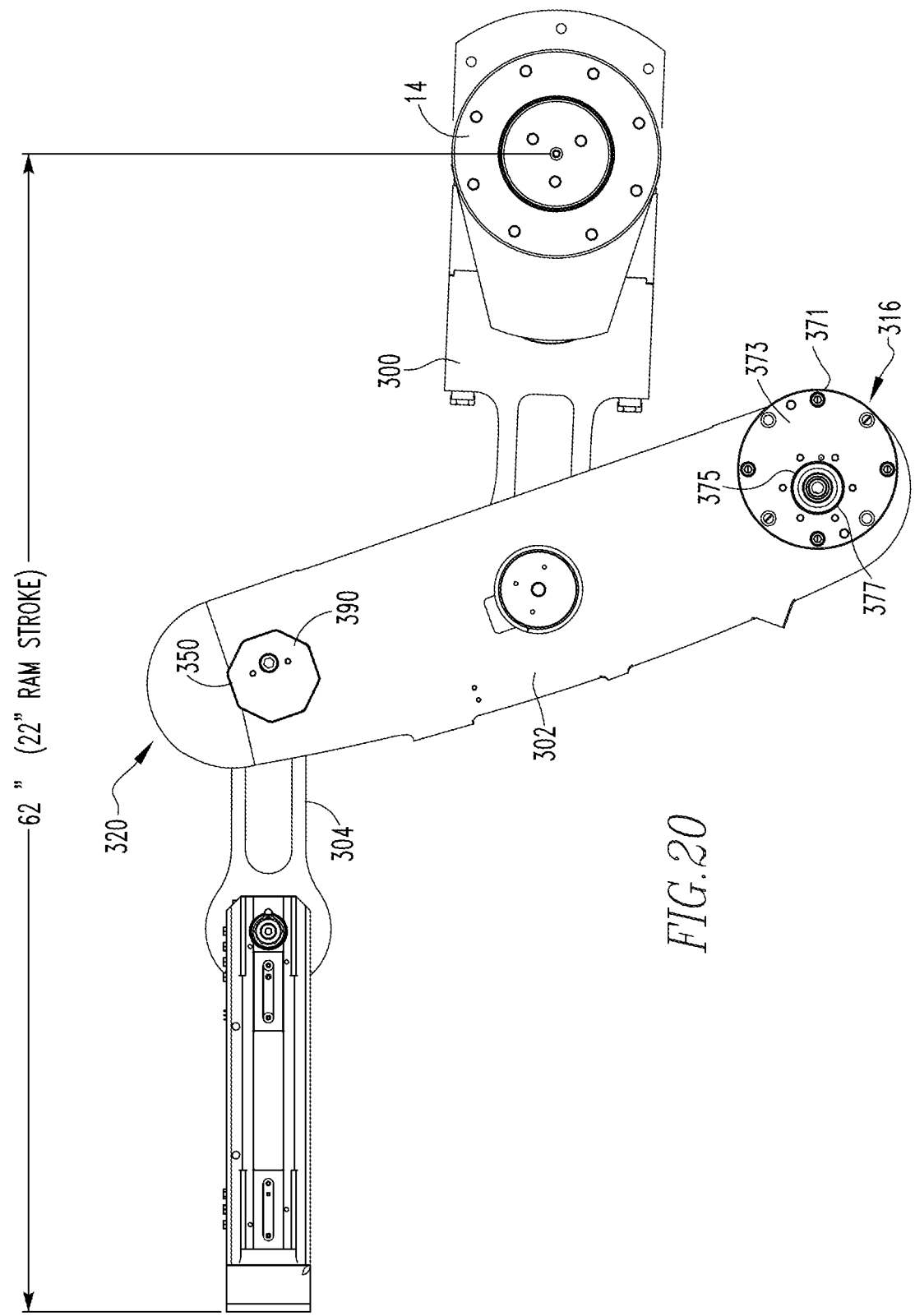
FIG. 20 is a side view of a swing lever with settable shape mounting lugs disposed in a first orientation and a swing lever body first end pivotal coupling in a first orientation.
Figure 21:
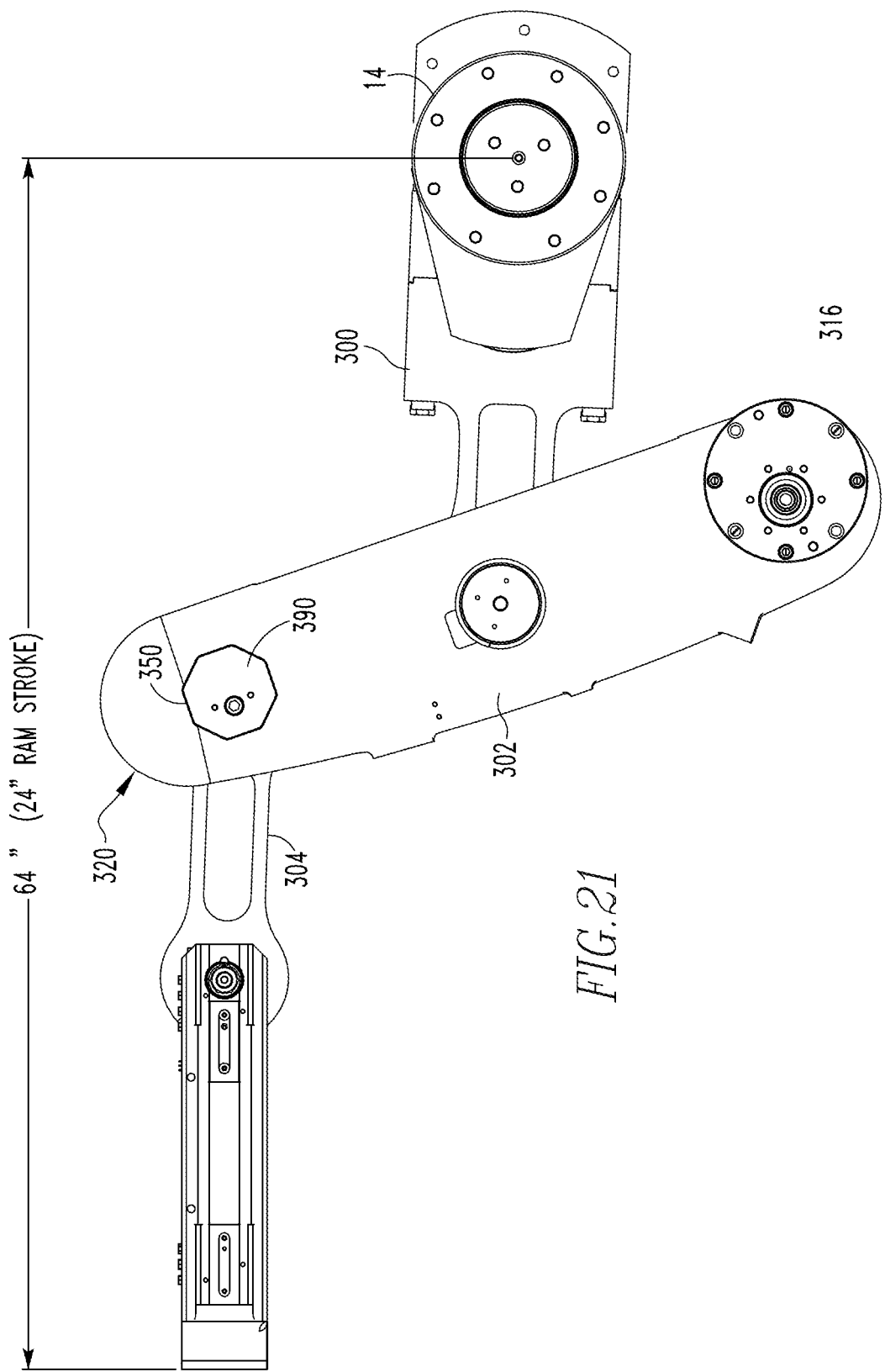
FIG. 21 is a side view of a swing lever with settable shape mounting lugs disposed in a second orientation and a swing lever body first end pivotal coupling in a first orientation.
Figure 22:
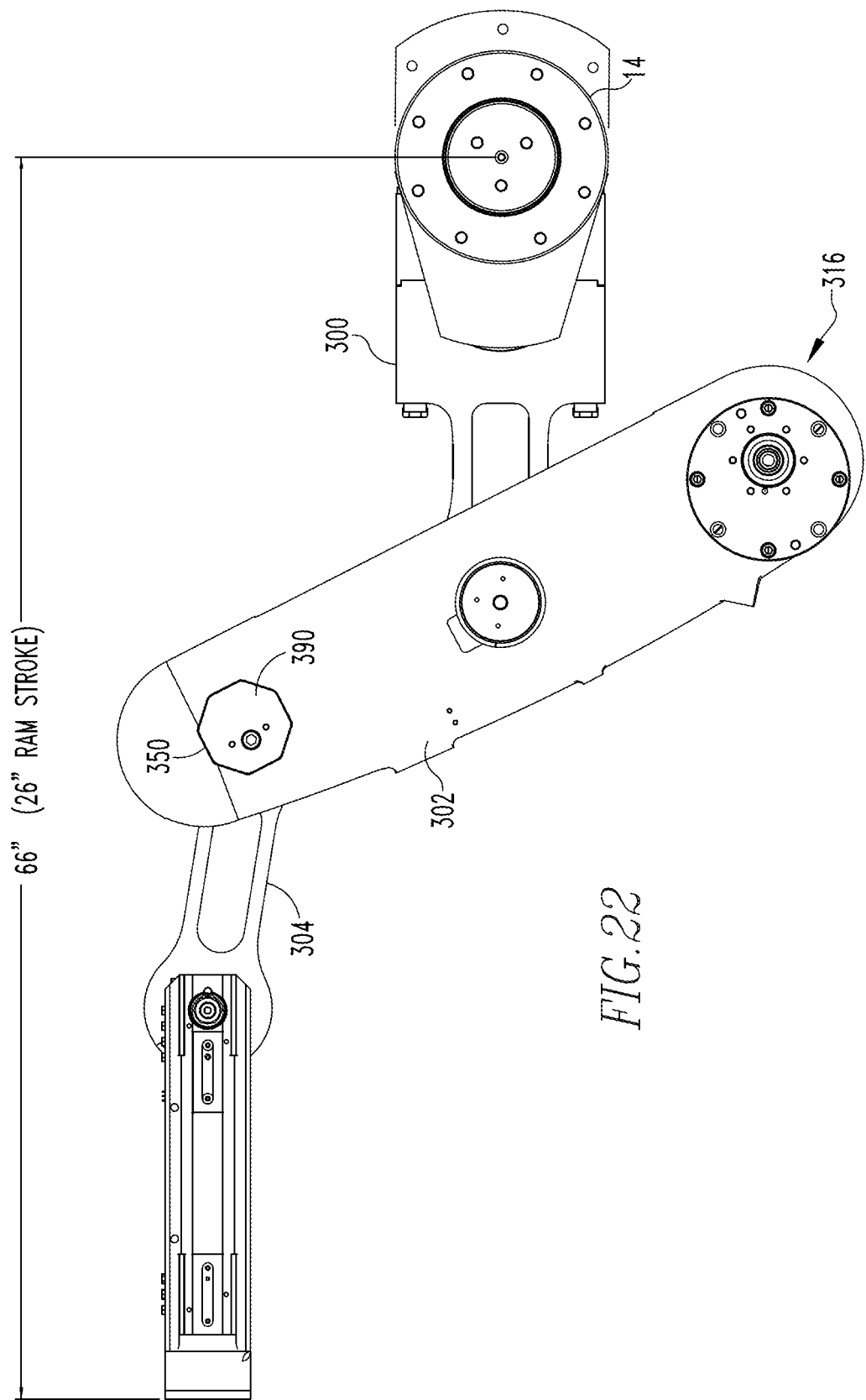
FIG. 22 is a side view of a swing lever with settable shape mounting lugs disposed in a second orientation and a swing lever body first end pivotal coupling in a second orientation.

In an exemplary embodiment, as shown in FIGS. 20-22, the swing lever body first end pivotal coupling 316 also includes an eccentric axle or bearing assembly 377. That is, the swing lever body first end pivotal coupling 316 is shown with a non-settable shape mounting first component 371, i.e., a substantially circular lug 373. It is understood that the substantially circular lug 373 has a center 375. Further, the swing lever body first end pivotal coupling 316 includes a bearing assembly 377 that is offset, or eccentric, relative to the circular lug center 375. That is, the swing lever body first end pivotal coupling bearing assembly 377 has a longitudinal axis that is offset, or eccentric, relative to the circular lug center 375.

In this configuration, the location of the bearing assembly body 380 is structured to be, and is, adjustable relative to a specific point on the swing lever 302. That is, as shown in FIGS. 20-22, the settable shape mounting lugs 390, 392 and the swing lever body first end pivotal coupling 316 are selectably oriented relative to the swing lever 302. In FIG. 20, the settable shape mounting lugs 390, 392 are oriented so that the bearing assembly 372 is disposed to the left (as shown). Conversely, as shown in FIGS. 21 and 22, the settable shape mounting lugs 390, 392 are oriented so that the bearing assembly 372 is disposed to the right (as shown).

It is understood that with the settable shape mounting lugs 390, 392 in other orientations, the bearing assembly 372 would be in different positions. Further, the swing lever body first end pivotal coupling 316 is also selectably oriented relative to the swing lever 302. In FIGS. 20 and 21, the swing lever body first end pivotal coupling 316 is oriented so that the swing lever body first end pivotal coupling bearing assembly 377 is disposed to the left (as shown). In FIG. 22, the swing lever body first end pivotal coupling 316 is oriented so that the swing lever body first end pivotal coupling bearing assembly 377 is disposed to the right (as shown). Further, as designated on FIGS. 20-22, the ram stroke, i.e., the distance the ram assembly body 30 travels relative to a fixed point on the frame assembly 11, e.g., the center of the axle of the drive mechanism 14 (as shown), changes depending upon the orientation(s) of the connection rod coupling 350 and the swing lever body first end pivotal coupling bearing assembly 377.

Thus, as set forth above, the swing lever body second end 314 is rotatably, and operatively, coupled to the secondary connection rod first end 332 by the connection rod coupling assembly 350. As such, the position of the bearing assembly body 380 relative to the swing lever body second end 314 changes the range of the ram assembly body 30. That is, if the die pack 16 is disposed to the left in FIGS. 20-22, then when the settable shape mounting lugs 390, 392 are oriented so that the bearing assembly 372 is disposed to the left (FIG. 22), the ram assembly body 30 will have a first range. Conversely, when the settable shape mounting lugs 390, 392 are oriented so that the bearing assembly 372 is disposed to the right (FIG. 20), the ram assembly body 30 will have a second range that is different, and in this instance, less than, the first range.

Figure 26:
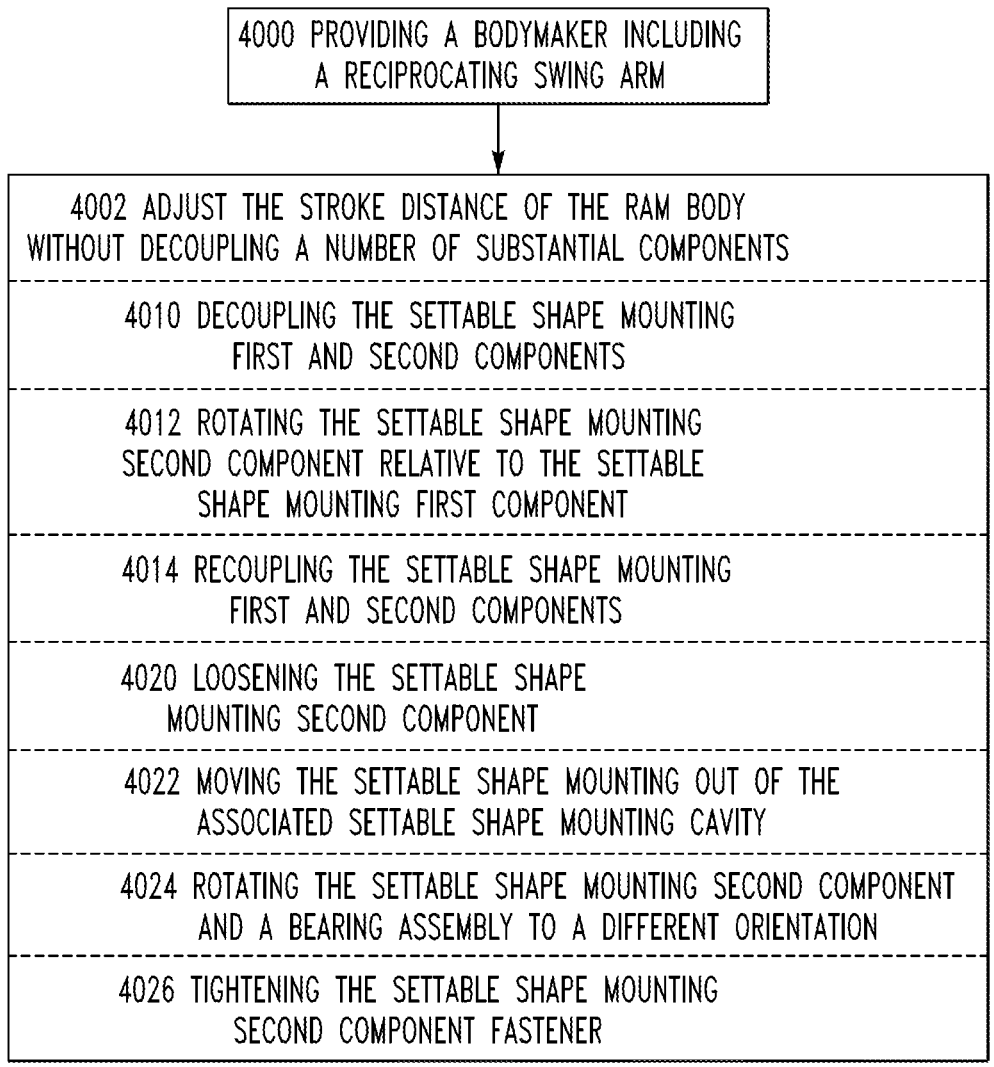
FIG. 26 is a flowchart showing a method of adjusting the stroke range of a bodymaker ram assembly.

Accordingly, as shown in FIG. 26, a method of adjusting the stroke range of a bodymaker ram assembly includes, providing 4000 a bodymaker including a reciprocating swing lever including a pivoting, first end and a moving, second end, the swing lever second end including a settable shape mounting first component, a ram assembly including an elongated ram assembly body, a carriage, and a connection rod, the ram assembly body including a distal end, the carriage, the carriage including a rotational coupling and a ram assembly body mounting, the ram assembly body fixed to the carriage ram assembly body mounting, the connection rod including a first end and a second end, the connection rod first end including a first rotational coupling, the connection rod second end including a second rotational coupling, the connection rod second end second rotational coupling rotatably coupled to the carriage rotational coupling, a connection rod coupling assembly, the connection rod coupling assembly including a settable shape mounting second component, and a bearing assembly, the settable shape mounting second component having a lateral, primary axis, the bearing assembly including a bearing assembly body, the bearing assembly body including a substantially cylindrical outer surface and a center axis, wherein the bearing assembly body center axis is offset relative to the settable shape mounting second component primary axis, the connection rod coupling assembly adjustably coupling the connection rod first end first rotational coupling to the swing lever second end, and, adjusting 4002 the stroke distance of the ram assembly body without decoupling a number of substantial components.

In an exemplary embodiment, adjusting 4002 the stroke distance of the ram assembly body without decoupling a number of substantial components includes decoupling 4010 the settable shape mounting first and second components, rotating 4012 the settable shape mounting second component relative to the settable shape mounting first component, and recoupling 4014 the settable shape mounting first and second components. That is, in the embodiment described above and assuming the connection rod coupling assembly 350 is in an operation, or installed, configuration, adjusting 4002 the stroke distance of the ram assembly body without decoupling a number of substantial components to adjust the range of the ram assembly body 30 includes the following. The settable shape mounting second component fastener 414 is loosened 4020, i.e., loosening the settable shape mounting second component fastener 414, but not decoupled from the threaded bore 412, the settable shape mounting lugs 390, 392 are moved 4022 out of the associated settable shape mounting cavities 362, the settable shape mounting second component 370 and a bearing assembly 372 are rotated 4024 to a different orientation, and the settable shape mounting second component fastener 414 is tightened 4026. Thus, at no time is the bearing assembly body 380 decoupled from the swing lever 302. This method solves the problems stated above.

As noted above, the swing lever 302 is an assembly (and is also identified herein as a "swing lever assembly 302"). In an exemplary embodiment, and as discussed above, the swing lever assembly 302 includes an elongated, unitary body 308 with a first end 310, a medial portion 312, and a second end 314. The swing lever assembly 302 also includes a cooling system 450 and a number of bearings 452. In this embodiment, the swing lever assembly 302 includes a limited number of components. That is, a "limited number of components" means less than sixty components and sub-assemblies. This limited number of components reduces the number of components and sub-assemblies that need to be manufactured and maintained and solve the problems noted above. Further, as used herein, the elements and subassemblies used to couple the swing lever assembly 302 to other elements of the bodymaker are included in the swing lever assembly 302 and are identified as "installation components." The "installation components" include couplings, bearings 452, spacers, shims, and excludes the swing lever body 308 and elements of the cooling system 450. In an exemplary embodiment, there are a "limited number of installation components." As used herein, a "limited number of installation components" means less than fifty installation components and sub-assemblies. Further, in another exemplary embodiment, the installation components do not include shims.

In an exemplary embodiment, as shown in FIGS. 12-14, the swing lever assembly body 308 defines two sides, a first sidewall 440 and a second sidewall 442, as well as a lateral wall 444. The swing lever assembly body lateral wall 444 extends from, and between, the perimeters of the swing lever assembly body first and second sidewalls 440, 442. In this configuration, the swing lever assembly body lateral wall 444 maintains a space between the swing lever assembly body first and second sidewalls 440, 442. That is, in an exemplary embodiment, the swing lever assembly body 308 is generally hollow. The swing lever assembly body lateral wall 444 includes a primary connection rod portal 446 and a secondary connection rod portal 448. The primary connection rod portal 446 is sized to allow the primary connection rod 300 to pass therethrough and travel over its path of motion when the bodymaker 10 is in use. Similarly, the secondary connection rod portal 448 is sized to allow the secondary connection rod 304 to pass therethrough and travel over its path of motion when the bodymaker 10 is in use.

The swing lever assembly body first end 310 defines a brace 456. That is, the swing lever assembly body first end is generally solid between the collar bodies 464, discussed below. The swing lever assembly body first end brace 456, however, further defines coolant passages 458 structured to allow a coolant fluid, and in an exemplary embodiment, a coolant liquid, to pass through the swing lever assembly body first end brace 456 to the inner surface of the collar bodies 464.

In an exemplary embodiment, the swing lever body first end pivotal coupling 316 includes a number of elongated collars 460, 462 (hereinafter "swing lever body first end pivotal coupling collars" 460, 462). That is, the swing lever assembly (unitary) body 308 includes elongated tubular bodies 464 (hereinafter "collar bodies" 464) that extend generally horizontally and generally laterally. Further, pivot bearings 470 are disposed in each collar body 464. Each pivot bearing 470 includes a substantially cylindrical inner surface. The frame assembly 11, or the drive mechanism 14, includes substantially cylindrical axle lugs (not shown) that are sized and shaped to correspond to the inner surface of the pivot bearings 470. The swing lever assembly 302 is pivotally coupled to the other elements of the bodymaker 10, and/or the frame assembly 11, when the axle lugs are disposed in the pivot bearings 470 and the swing lever assembly body 308 is structured to pivot between the retracted, first position and a forward, second position.

The swing lever assembly body medial portion 312 defines a yoke 480. That is, the swing lever assembly body medial portion 312 includes two openings 482, 484 that are disposed on the swing lever assembly body first and second sidewalls 440, 442. The swing lever assembly body medial portion yoke openings 482, 484 are part of the swing lever body medial portion 312 rotational coupling 317. The swing lever assembly body medial portion yoke openings 482, 484 are generally horizontally aligned. The swing lever assembly body medial portion yoke 480 is structured to be, and is, rotatably coupled to the primary connection rod 300. In an exemplary embodiment, the swing lever assembly 302 includes a primary connection rod bearing 486 that is disposed in the swing lever assembly body medial portion yoke 480 and which is further coupled to the primary connection rod 300.

The swing lever assembly body medial portion 312 further includes internal support collars 490. As used herein, and in reference to the swing lever body 308, "internal" means within the hollow space defined by the unitary swing lever body 308. That is, the swing lever assembly body medial portion 312 includes collars 490 disposed about the swing lever assembly body medial portion yoke openings 482, 484. The swing lever assembly body medial portion support collars 490 are structured to, and do, substantially center the primary connection rod bearing 486 between the swing lever assembly body first and second sidewalls 440, 442.

The swing lever assembly body second end 314 also includes internal support collars 500. That is, the swing lever assembly body second end 314 includes collars 500 disposed about the swing lever assembly body second end portion yoke opening 326, 328. The swing lever assembly body second end support collars 490 are structured to, and do, substantially center the connection rod coupling assembly bearing assembly 372 between the swing lever assembly body first and second sidewalls 440, 442.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A bodymaker comprising:
a frame assembly, said frame assembly including a forward end;
an elongated ram;
a drive mechanism coupled to said frame assembly and operatively coupled to said ram; and
an aligned forward module comprising a number of coupled components and a unitary forward mounting body, said aligned forward module coupled to said frame assembly forward end;
wherein:
said unitary forward mounting assembly includes a body;
said number of coupled components includes a die pack and a domer assembly;
said unitary forward mounting assembly body including a cradle portion, a first support arm portion and a second support arm portion;
wherein said cradle portion has a forward side, a rear side, a right side, and a left side;
said first support arm portion disposed at said cradle portion right side;
said second support arm portion disposed at said cradle portion left side;
said die pack is directly coupled to said cradle portion; and
said domer assembly directly coupled to said first support arm portion and to said second support arm portion.

2. The bodymaker of claim 1 wherein said aligned forward module is a complete aligned forward module.

3. The bodymaker of claim 1 wherein said unitary forward mounting body includes one of a die pack mounting, a domer door assembly mounting, a stripper bulkhead assembly mounting, a turret sub-assembly mounting or a cup load station assembly mounting.

4. A bodymaker comprising:
a frame assembly, said frame assembly including a forward end;
an elongated ram;
a drive mechanism coupled to said frame assembly and operatively coupled to said ram; and
an aligned forward module comprising a number of coupled components and a unitary forward mounting body, said aligned forward module coupled to said frame assembly forward end;
wherein said unitary forward mounting assembly includes a body;
wherein said number of coupled components includes a die pack and a domer assembly;
wherein said unitary forward mounting assembly body including a cradle portion, a first support arm portion and a second support arm portion;
wherein said cradle portion has a forward side, a rear side, a right side, and a left side;
wherein said first support arm portion disposed at said cradle portion right side;
wherein said second support arm portion disposed at said cradle portion left side;
wherein said unitary forward mounting body includes one of a die pack mounting, a domer door assembly mounting, a stripper bulkhead assembly mounting, a turret sub-assembly mounting or a cup load station assembly mounting; wherein:

said cradle portion defines said die pack mounting and said cup load station assembly mounting;

said first support arm portion defines said turret sub-assembly mounting;

said first support arm portion and said second support arm portion collectively define said domer door assembly mounting; and said cradle portion, said first support arm portion and said second support arm portion collectively define said stripper bulkhead assembly mounting.

5. The bodymaker of claim 1 wherein said unitary forward mounting body includes a cup infeed housing plate.

6. The bodymaker of claim 5 wherein no machined surface exists between said cradle portion and said cup infeed housing plate.

7. The bodymaker of claim 1 wherein no machined surface exists between said cradle portion and either of said first support arm portion or said second support arm portion.

8. The bodymaker of claim 1 wherein no shims are disposed between said cradle portion and either of said first support arm portion or said second support arm portion.

9. The bodymaker of claim 1 wherein said unitary forward mounting body is one of a cast body or a printed body.

\* \* \* \* \*